US012629700B2

(12) United States Patent
Piramoon

(10) Patent No.: US 12,629,700 B2
(45) Date of Patent: May 19, 2026

(54) CONTINUOUS BIOPROCESSING CENTRIFUGE ROTOR

(71) Applicant: FIBERLITE CENTRIFUGE LLC, Santa Clara, CA (US)

(72) Inventor: Sina Piramoon, San Jose, CA (US)

(73) Assignee: Fiberlite Centrifuge LLC, Santa Clara, CA (US)

(*) Notice: Subject to any disclaimer, the term of this patent is extended or adjusted under 35 U.S.C. 154(b) by 591 days.

(21) Appl. No.: 18/002,676

(22) PCT Filed: Aug. 11, 2021

(86) PCT No.: PCT/US2021/045525

§ 371 (c)(1),
(2) Date: Dec. 21, 2022

(87) PCT Pub. No.: WO2022/035952

PCT Pub. Date: Feb. 17, 2022

(65) Prior Publication Data

US 2023/0234075 A1 Jul. 27, 2023

Related U.S. Application Data

(60) Provisional application No. 63/065,678, filed on Aug. 14, 2020.

(51) Int. Cl.
*B04B 11/02* (2006.01)
*B04B 5/04* (2006.01)
(Continued)

(52) U.S. Cl.
CPC ............ *B04B 11/02* (2013.01); *B04B 5/0428* (2013.01); *B04B 5/0442* (2013.01); *B04B 7/085* (2013.01); *B04B 9/12* (2013.01)

(58) Field of Classification Search
CPC ..... B04B 11/02; B04B 5/0428; B04B 5/0442; B04B 7/085; B04B 9/12; C12M 1/007;
(Continued)

(56) References Cited

U.S. PATENT DOCUMENTS 3,104,225 A * 9/1963 Di Benedetto ........... B04B 1/00 494/45
3,675,846 A * 7/1972 Drucker ................ B04B 5/0428 494/45
(Continued)

FOREIGN PATENT DOCUMENTS

CN 103191480 A 7/2013
CN 105143432 A 12/2015
(Continued)

OTHER PUBLICATIONS

PCT/US2021/045525, International Search Report and Written Opinion, Jan. 31, 2022.

*Primary Examiner* — Claire X Wang
*Assistant Examiner* — Shuyi S. Liu
(74) *Attorney, Agent, or Firm* — BakerHostetler

(57) ABSTRACT

A rotor assembly (10, 150, 270, 310) and method of using the rotor assembly (10, 150, 270, 310). The rotor assembly (10, 150, 270, 310) includes a bio-process bag (48), a drum (46) that receives a lower portion of the bag (48), and a pressure ring (50). A holder (54, 182) couples an upper portion of the bag (48) to the pressure ring (50). The pressure ring (50) is coupled to the drum (46) to define an interior space that contains the bag (48). A liquid transport assembly (35, 178, 272) passes through an opening in the holder (54, 182) so that liquids can be added to, and removed from, the bag (48) without removing the rotor (16, 154) from the centrifuge. A bearing assembly (190) in the holder (54, 182) couples the liquid transport assembly (35, 178, 272) to the rotor (16, 154), and enables the liquid transport assembly
(Continued)

(35, 178, 272) to remain stationary while the rotor (16, 154) rotates around it. One or more seal assemblies (276, 312) provide a fluid-tight seal against the outer portion of the liquid transport assembly (35, 178, 272), and prevent fluids from leaking from the bag (48) during centrifugation.

13 Claims, 26 Drawing Sheets

(51) Int. Cl.
*B04B 7/08* (2006.01)
*B04B 9/12* (2006.01)

(58) Field of Classification Search
CPC ........ C12M 1/10; C12M 21/00; C12M 43/00; C12M 45/05
USPC ........................................ 494/16, 20, 21, 80
See application file for complete search history.

(56) References Cited

U.S. PATENT DOCUMENTS

| | | | | |
|---|---|---|---|---|
| 4,056,225 | A | 11/1977 | Hein, Jr. | |
| 8,323,169 | B2 | 12/2012 | Piramoon | |
| 2002/0144939 | A1 | 10/2002 | Dolecek | |
| 2007/0213191 | A1 | 9/2007 | Chammas | |
| 2017/0189915 | A1* | 7/2017 | Mackel | B04B 11/02 |
| 2018/0147581 | A1 | 5/2018 | Quiter et al. | |
| 2019/0231965 | A1* | 8/2019 | Murphy | A61M 1/3693 |

FOREIGN PATENT DOCUMENTS

| | | | |
|---|---|---|---|
| CN | 106413905 | A | 2/2017 |
| CN | 107683177 | A | 2/2018 |
| JP | 52145578 | U | 11/1977 |
| WO | 02081096 | A1 | 10/2002 |

* cited by examiner

410

STEP 1

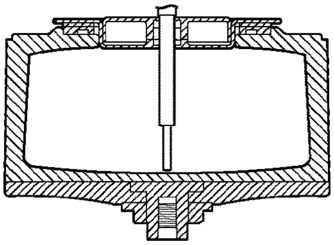

Rotor is empty and at zero RPM.

STEP 2

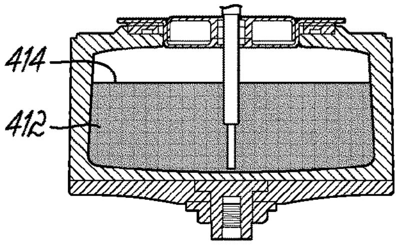

At zero RPM, a volume of 25 liters from the sedimentation solution is pumped to the rotor by the control system of centrifuge.

RPM = 0 RPM
V = 25 Liters

STEP 3

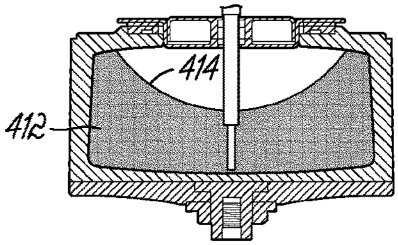

Rotor starts spinning slowly up to 100 RPM. A parabolic surface forms. This step continues for 3-5 minutes.

RPM = 100 RPM
V = 25 Liters

STEP 4

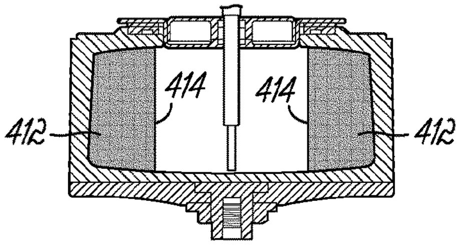

Rotor spins rapidly to max. 5,000 RPM. Fluid shapes to a cylindrical torus.

RPM = 5,500 RPM
V = 25 Liters

TO FIG. 25

FIG. 24

410

FROM FIG. 24

STEP 5

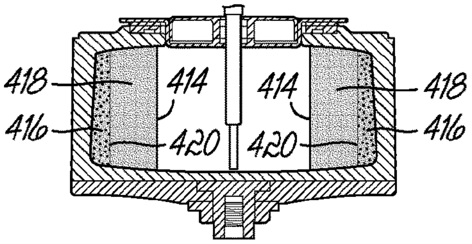

At 5,000 RPM the sedimentation starts and pellets form in a neo angle in a cylindrical shape. Rotor spins for 30 minutes.

RPM = 5,500 RPM
V = 25 LITERS

STEP 6

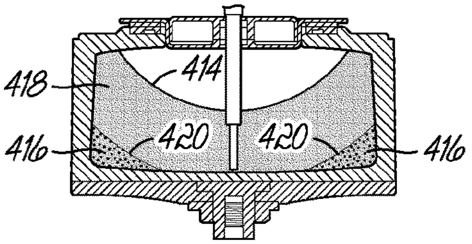

In a first stage, rotor decelerates from 5,000 RPM to 800 RPM. Then in the 2nd stage, rotor decelerates slowly from 800 RPM to 100 RPM. In this regime, the pellets form in the corner of the rotor and the supernatants form to a parabolic surface. At such RPM, the discharge pump activates by the control system of the centrifuge and the supernatants pumps out of the rotor.

RPM = 100 RPM
V = 25 LITERS

STEP 7

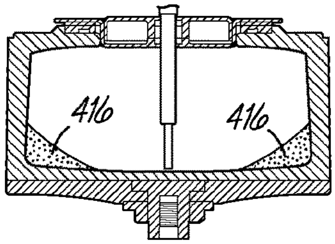

After removal of all the supenatant fluid, the pellets remain in the corner of the rotor. Then, rotor decelerates from 100 rpm to zero rpm to stop. At this point, a new fluid can pump in the rotor and sedimentation starts until the pellet saturation happens, or we can replace the bag and remove the pellets.

RPM = 0 RPM
V = 25 LITERS

STEP 8

Customer could toss out the one time use bag and replace a new sterile bag assembly to the rotor.

FIG. 25

430

STEP 1

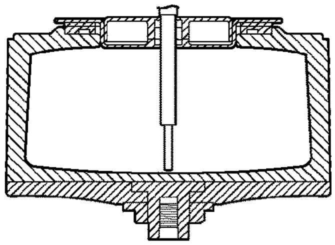

Rotor is empty and at zero RPM.

STEP 2

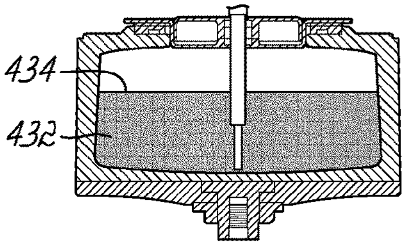

At zero RPM, A volume of 20 liters from the density gradient solution is pumped to the rotor by the control system of the centrifuge.

RPM = 0 RPM
V = 20 Liters

STEP 3

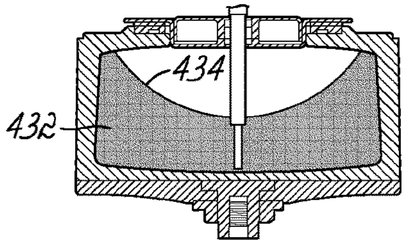

Rotor starts spinning slowly up to 100 RPM. A parabolic surface forms. This step continues for 3-5 minutes.

RPM = 150 RPM
V = 20 Liters

STEP 4

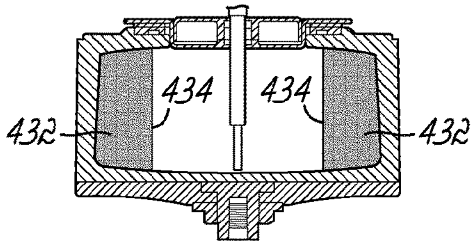

Rotor spins rapidly to max. 5,000 RPM. Fluid shapes to a cylindrical torus. Rotor spins for 2 minutes.

RPM = 5,500 RPM
V = 20 Liters

TO FIG. 27

FIG. 26

FROM FIG. 26

430

STEP 5

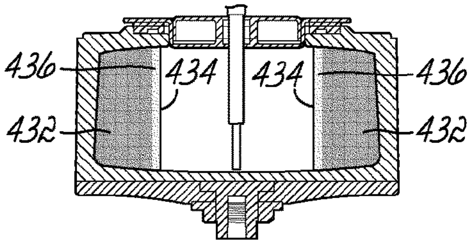

At max. spin rate, the zonal fluid pumps to the rotor. The total volume of rotor increases to 25 liters. Zonal fluid forms at the rear side of the zonal gradient fluid in rotor chamber.

RPM = 5,500 RPM
V = 25 LITERS

STEP 6

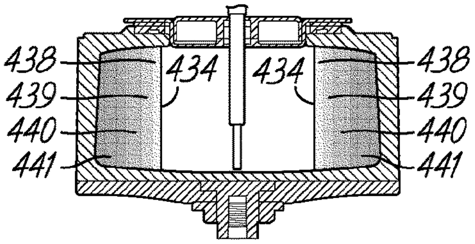

At max. spin rate, the zonal fluid particles start to sediment toward the Rmax of the rotor. They generate isopycnically cylindrical layers relative to their density gradients. Rotor spins for 60 minutes.

RPM = 5,500 RPM
V = 25 LITERS

STEP 7

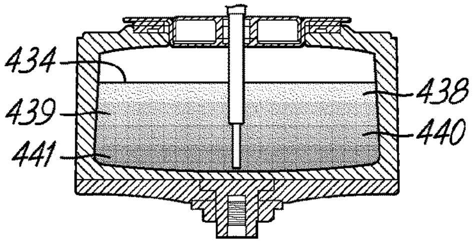

Rotor slowly decelerates to zero RPM. The zonal fluids form horizontal sandwiched layers on top of each other based on their density. The centrifuge control system pumps out the zonal fluids in separate stages.

RPM = 0 RPM
V = 25 LITERS

STEP 8

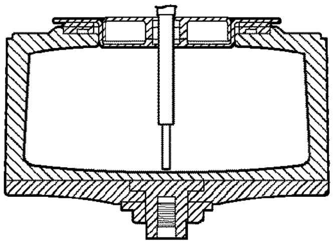

Rotor is empty and is ready for the next batch of fluid to get pumped in the rotor.

RPM = 0 RPM
V = 0 LITERS

STEP 9

Customer could toss out the one time use bag and replace a new sterile bag assembly to the rotor.

FIG. 27

CONTINUOUS BIOPROCESSING CENTRIFUGE ROTOR

CROSS-REFERENCE TO RELATED APPLICATIONS

This application is the National Stage Application of International Patent Application No. PCT/US2021/045525 (filed Aug. 11, 2021), which claims priority to and the benefit of U.S. Patent Application No. 63/065,678 (filed Aug. 14, 2020). The entireties of the foregoing applications are incorporated herein by reference for any and all purposes.

TECHNICAL FIELD

The present invention relates generally to centrifuge rotors and, more particularly, to a rotor configured for continuous processing of biological suspensions in a centrifuge.

BACKGROUND

Bioreactors and fermenters are used to grow biological suspensions that include cells or microorganisms suspended in a liquid medium. Once a biological suspension has been sufficiently grown, it is typically separated into liquid and solid components. The separated components are then harvested for subsequent analysis or use. Centrifugation is a common technique for separating biological components, such as cells, organelles, and biopolymers, including proteins, nucleic acids, lipids, and carbohydrates dispersed in biological suspension.

Centrifugation typically involves dispensing quantities of a suspension from a bioreactor or fermenter into a processing container, such as a bottle or a bag. The container is then closed and spun in a centrifuge. The centrifugal force created by spinning a rotor in the centrifuge causes the solids in the suspension to settle out and form a generally solid pellet toward the bottom of the container. A supernatant comprising liquid that is less dense than the pellet collects in the container above the pellet. In other cases, a density gradient may form in the suspension, with isopycnic layers of liquid containing solids of similar densities forming one on top of the other. In either case, once the supernatant and pellet or the isopycnic layers have formed, the separated components may be decanted by pouring, pumping, or otherwise removing each component from the container.

Conventional centrifugation processes have a number of shortcomings. For example, in order to increase throughput, it is typically desirable for the containers to hold as much suspension as possible. However, as the size of the container is increased, it becomes more difficult for an operator to place containers in and remove containers from the centrifuge. Increasing the number of containers which are loaded into the centrifuge can also increase throughput. However, having a large number of containers also increases the amount of time it takes the operator to load and unload each batch of containers from the centrifuge.

Another problem with centrifugation is how to remove each of the various separated components without disturbing the other components. This problem can be exacerbated if the containers are large or otherwise difficult to remove from the centrifuge due to increased jostling of the container, which can cause remixing of the separated components.

Thus, there is a need for improved methods and systems for centrifugation of biological suspensions.

SUMMARY

The present invention overcomes the foregoing and other shortcomings and drawbacks of centrifuge rotors heretofore known for use in centrifugation of biological suspensions. While the present invention will be discussed in connection with certain embodiments, it will be understood that the present invention is not limited to the specific embodiments described herein.

In an embodiment of the present invention, a rotor assembly for centrifuging liquid media is provided. The rotor assembly includes a bio-process bag, a drum, and a holder. The bio-process bag has a lower portion and an upper portion. The upper portion of the bio-process bag includes an axially-aligned neck connected to the lower portion of the bio-process bag, and a radially-aligned skirt that extends outward from the axially-aligned neck. The drum includes a first base having an outer rim and a first circumferential wall that extends upward from the outer rim. The first circumferential wall includes a first outer surface and a first inner surface, with the first inner surface defining a first opening that receives the lower portion of the bio-process bag a pressure ring including a first radially-aligned flange and a second circumferential wall. The first radially-aligned flange includes a first upper surface, an outer edge, and an inner edge that defines a second opening. The second circumferential wall extends downward from the outer edge, and has a second inner surface that engages the first outer surface of the first circumferential wall of the drum. The holder includes a third circumferential wall having an outwardly-facing surface and a second radially-aligned flange having a first lower surface. The second radially-aligned flange extends outwardly from an upper portion of the third circumferential wall, and at least one of the outwardly-facing surface and the first lower surface operatively couples the upper portion of the bio-process bag to the pressure ring.

In an aspect of the present invention, the rotor assembly may further include a compression ring having a second upper surface with a recessed annulus. The recessed annulus may be open on an axial side of the compression ring and define a radially-aligned circumferential channel with the first lower surface of the second radially-aligned flange of the holder. The radially-aligned circumferential channel may be configured to receive at least a portion of the radially-aligned skirt of the bio-process bag.

In another aspect of the present invention, the second radially-aligned flange of the holder and the compression ring may each include a plurality of pass-through holes, and the rotor assembly may further include a plurality of retaining bolts and a retaining ring having a plurality of threaded holes each configured to receive a respective one of the retaining bolts. Each retaining bolt may pass through a respective pass-through hole of the second radially-aligned flange and the compression ring, and the compression ring may be subjected to a compressive force by the second radially-aligned flange and the retaining ring in response to tightening of the retaining bolts.

In another aspect of the present invention, the pressure ring may include a circumferential ridge that projects upward from the first upper surface of the first radially-aligned flange, and may include an axially-aligned inwardly-facing surface configured to center the retaining ring about the second opening defined by the inner edge of the pressure ring.

In another aspect of the present invention, the drum may include a plurality of axially-aligned baffles.

In another aspect of the present invention, the lower portion of the bio-process bag may include a plurality of interior pockets and a plurality of exterior pockets each located between two adjacent interior pockets, and each of the exterior pockets may be configured to engage a respective one of the axially-aligned baffles of the drum.

In another aspect of the present invention, each of the axially-aligned baffles may include a hollow, the first base may include a second lower surface with a third opening into the hollow of each axially-aligned baffle, and the rotor assembly may further include a torque transfer module having a third upper surface with a plurality of projections each configured to engage a respective third opening in the second lower surface of the first base.

In another aspect of the present invention, the rotor assembly may further include a housing having a cover and a second base configured to receive the cover, and the bio-process bag, the drum, the pressure ring, and the holder may comprise a rotor that rotates within the housing.

In another aspect of the present invention, the third circumferential wall of the holder may include an inwardly-facing surface that defines a fourth opening, and the rotor assembly may further include a decanting assembly that passes through the cover and the fourth opening. The decanting assembly may have an input port through which a first liquid medium is removed from the bio-process bag. The first base may include a fourth upper surface having an upwardly-facing bowl shape that defines a catchment proximate to an axis of rotation of the rotor, and the input port of the decanting assembly may be located proximate to the catchment.

In another aspect of the present invention, the rotor assembly may further include a feed assembly that passes through the cover and the fourth opening. The feed assembly may include a feed assembly output port through which a second liquid medium is provided to the bio-process bag.

In another aspect of the present invention, the first liquid medium may be a supernatant, and the second liquid medium may be a suspension.

In another aspect of the present invention, the feed assembly may further include a feed assembly input port and a feed tube having a third inner surface with a first diameter, and the decanting assembly may include a decanting tube having a second outer surface with a second diameter smaller than the first diameter and that passes longitudinally through the feed tube. The first diameter may be larger than the second diameter along at least a portion of the decanting tube such that the decanting tube and the feed tube define an annular channel between the second outer surface of the decanting tube and the third inner surface of the feed tube. The annular channel may fluidically couple the feed assembly input port to the feed assembly output port.

In another aspect of the present invention, the rotor assembly may further include a bearing assembly, a liquid transport assembly that passes through the cover and the bearing assembly and that includes a first port through which a first liquid medium is removed from the bio-process bag, and a second port through which a second liquid medium is provided to the bio-process bag.

In another aspect of the present invention, the holder may include a lower section having a first cylindrical annulus, and an upper section including a second cylindrical annulus. The first cylindrical annulus and the second cylindrical annulus may define a central cavity that holds the bearing assembly when the lower section is coupled to the upper section.

In another aspect of the present invention, the bearing assembly may include an upper bearing having a first inner ring with a first bore, a lower bearing having a second inner ring with a second bore, and a cylindrical spacer that vertically positions the upper bearing relative to the lower bearing such that first bore and the second bore couple the bearing assembly to the liquid transport assembly.

In another aspect of the present invention, the rotor assembly may further include a seal bearing having a fifth upper surface and a third lower surface. The seal bearing may be coupled to the cover of the housing through the fifth upper surface, and in rotational contact with the holder through the third lower surface.

In another aspect of the present invention, the rotor assembly may further include a seal drive hub having a third outer surface and a fourth lower surface, and the seal drive hub may be coupled to the cover of the housing through the third outer surface, and may be coupled to the fifth upper surface by the fourth lower surface.

In another aspect of the present invention, the fourth lower surface may include one or more projections, the fifth upper surface may include one or more notches, and each of the projections may engage a respective notch so that the seal bearing is prevented from rotating relative to the seal drive hub.

In another aspect of the present invention, the seal drive hub may further include one or more heat pipes configured to conduct heat away from the seal bearing.

In another aspect of the present invention, the cover of the housing may include a first center hole, and the rotor assembly may further include a torque retaining hub that couples the seal drive hub to the first center hole.

In another aspect of the present invention, the torque retaining hub may include a second center hole having a non-circular shape, and the third outer surface of the seal drive hub may have the non-circular shape and be configured to engage the second center hole of the torque retaining hub so that the seal drive hub is prevented from rotating relative to the torque retaining hub by the non-circular shape.

In another aspect of the present invention, the seal drive hub may include a threaded bore, the liquid transport assembly may include an integral collar having a fourth outer surface with a threaded portion configured to threadedly engage the threaded bore of the seal drive hub, and the liquid transport assembly may be coupled to the cover of the housing by the seal drive hub.

In another aspect of the present invention, the liquid transport assembly may include an integral collar having a fourth outer surface with a smooth portion, the seal bearing may include an inner groove, and the rotor assembly may further include an elastic member located in the inner groove of the seal bearing that provides a fluid-tight seal between the seal bearing and the smooth portion of the fourth outer surface of the integral collar of the liquid transport assembly.

In another aspect of the present invention, the holder may include a first central opening through which the liquid transport assembly passes, and the rotor assembly may further include a seal bearing having a first inner groove and a second upper surface in rotational contact with the holder, and a first elastic member located in the first inner groove of the seal bearing that couples the seal bearing to the liquid transport assembly.

In another aspect of the present invention, the holder may include a lower plate coupled to a lower portion of the third circumferential wall, wherein the central opening is in the lower plate.

In another aspect of the present invention, the rotor assembly may further include a second elastic member configured to urge the seal bearing into the rotational contact with the lower plate of the holder.

In another aspect of the present invention, the rotor assembly may further include a retainer having a first cylindrical sleeve with an inner surface, and a first annular flange that extends radially inward from a bottom portion of the first cylindrical sleeve to define a second central opening that provides a friction or sliding fit with the liquid transport assembly. The first cylindrical sleeve may have an inner diameter sufficient to define an annular space between the inner surface of the first cylindrical sleeve and the liquid transport assembly, and a first end of the second elastic member may be retained in the annular space.

In another aspect of the present invention, the rotor assembly may further include a bearing support having a second cylindrical sleeve and a second annular flange that extends radially inward from a top portion of the second cylindrical sleeve. The second annular flange may include an upper surface, a lower surface, and define a third central opening that provides a sliding fit with the liquid transport assembly. The bearing support may be configured so that the second end of the second elastic member engages the lower surface of the second annular flange, and the upper surface of the second annular flange engages a bottom surface of the seal bearing.

In another aspect of the present invention, the second cylindrical sleeve may have an inner diameter larger than an outer diameter of the first cylindrical sleeve, and provide a sliding fit between the first cylindrical sleeve and the second cylindrical sleeve.

In another aspect of the present invention, the rotor assembly may further include a third elastic member, the second annular flange may include a second inner groove, and the third elastic member may be located in the second inner groove and couple the bearing support to the liquid transport assembly.

In another aspect of the present invention, the first and third elastic members may be O-rings, and the second elastic member may be a helical spring.

In another embodiment of the present invention, a method of centrifuging a liquid medium including a first component and a second component is provided. The method includes providing the first amount of the liquid medium to the rotor, accelerating the rotor in one or more stages until the rotor reaches a first angular velocity that causes at least a portion of the liquid medium to separate into the first component and the second component, and decelerating the rotor in one or more stages until the rotor reaches a second angular velocity less than the first angular velocity. While the rotor is rotating at the second angular velocity, the method removes at least a portion of the first component from the rotor, and after removing the portion of the first component from the rotor, adds a second amount of the liquid medium to the rotor. The method then accelerates the rotor in one or more stages until the rotor reaches the first angular velocity that causes at least a portion of the second amount of the liquid medium to separate into the first component and the second component so that the second component accumulates in the rotor.

In another aspect of the present invention, accelerating the rotor in one or more stages until the rotor reaches the first angular velocity may include accelerating the rotor at a first angular acceleration rate until the rotor reaches a third angular velocity, rotating the rotor at the third angular velocity for a first period of time, and, after the first period of time has expired, accelerating the rotor at a second angular acceleration rate greater than the first angular acceleration rate until the rotor reaches the first angular velocity.

In another aspect of the present invention, the third angular velocity may cause a surface of the liquid medium to have a parabolic shape while the rotor is rotating at the third angular velocity, and the first angular velocity may cause the surface of the liquid to have a cylindrical shape while the rotor is rotating at the first angular velocity.

In another aspect of the present invention, the third angular velocity may be about 100 rotations per minute, and the first angular velocity may be between 5,000 and 5,500 rotations per minute.

In another aspect of the present invention, decelerating the rotor in one or more stages until the rotor reaches the second angular velocity may include decelerating the rotor at a third angular acceleration rate until the rotor reaches a fourth angular velocity, rotating the rotor at the fourth angular velocity for a second period of time, and, after the second period of time has expired, decelerating the rotor at a fourth angular acceleration rate less than the third angular acceleration rate until the rotor reaches the second angular velocity.

In another embodiment of the present invention, yet another method of centrifuging the liquid medium including the first component and the second component is provided. The method includes adding a first batch of the liquid medium to a rotor including a bio-process bag having plurality of interior pockets, accelerating the rotor in one or more stages until the rotor reaches the first angular velocity that causes at least a portion of the liquid medium to separate into the first component and the second component, and accumulating the second component in the plurality of interior pockets.

In an aspect of the present invention, the method may further include decelerating the rotor in one or more stages until the rotor reaches the second angular velocity less than the first angular velocity, and while the rotor is rotating at the second angular velocity, removing the portion of the first component from the rotor. After removing the portion of the first component from the rotor, the method may add a second batch of the liquid medium to the rotor, accelerate the rotor in one or more stages until the rotor reaches the first angular velocity, and accumulate the second component of the second batch of the liquid medium in the plurality of interior pockets.

In another aspect of the present invention, the method may further include repeating the steps of decelerating of the rotor to the second angular velocity, removing the portion of the first component from the rotor, adding another batch of the liquid medium to the rotor, accelerating the rotor to the first angular velocity, and accumulating the second component in the plurality of interior pockets, and removing the second component from the rotor.

In another aspect of the invention, removing the second component from the rotor may include stopping rotation of the rotor, and removing the bio-process bag from the rotor.

BRIEF DESCRIPTION OF THE DRAWINGS

The accompanying drawings, which are incorporated in and constitute a part of this specification, illustrate certain embodiments of the present invention and, together with a general description of the invention given above, and the detailed description given below, serve to explain the invention.

FIGS. 24-27 are schematic views of processes that may be used with the rotor assemblies of FIGS. 1-23 for centrifugation of a liquid medium in accordance with an embodiment of the present invention.

DETAILED DESCRIPTION

Figure 1:
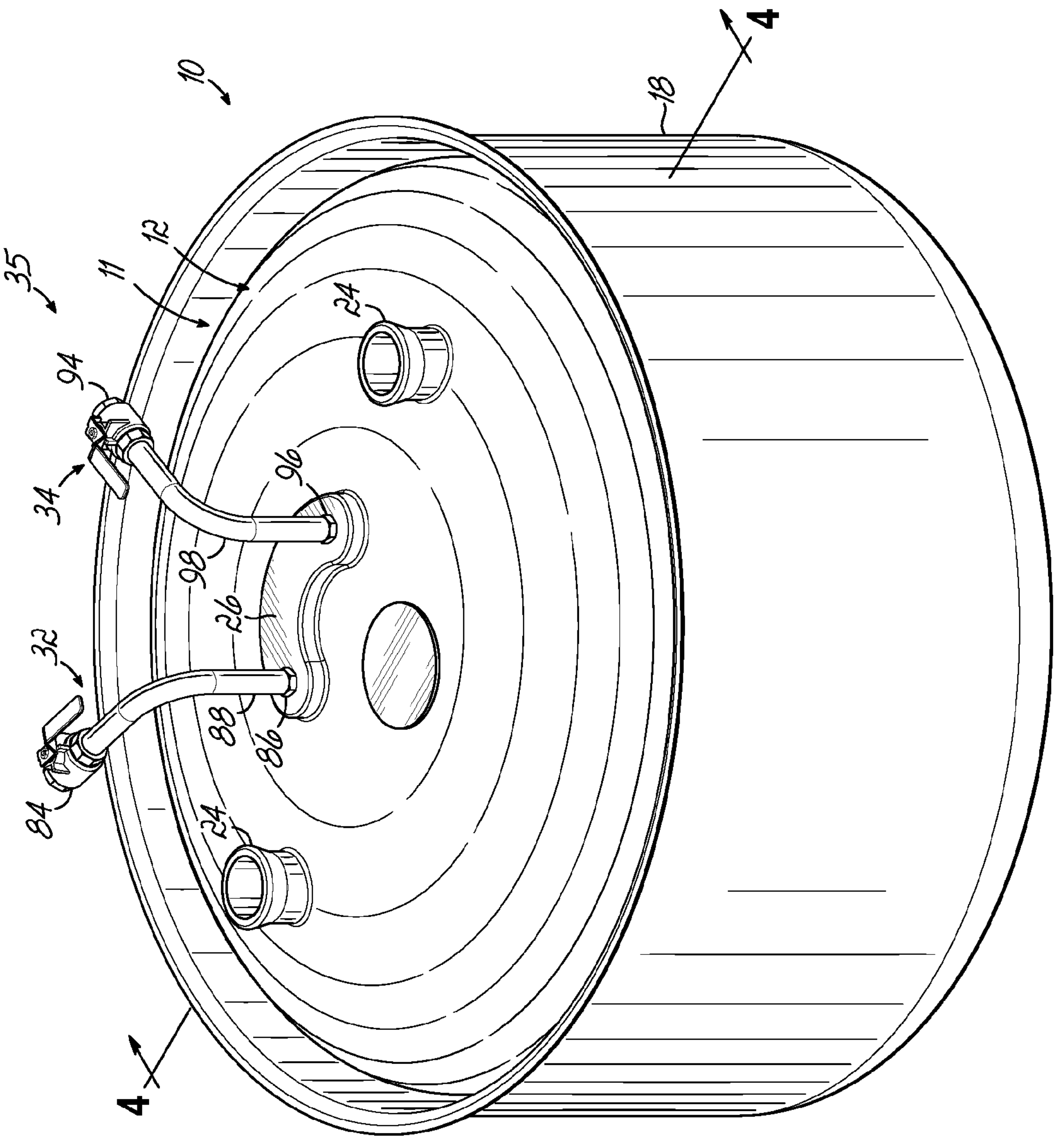
FIG. 1 is a perspective view of a continuous-flow sealed rotor assembly in accordance with an embodiment of the present invention.
Figure 2:
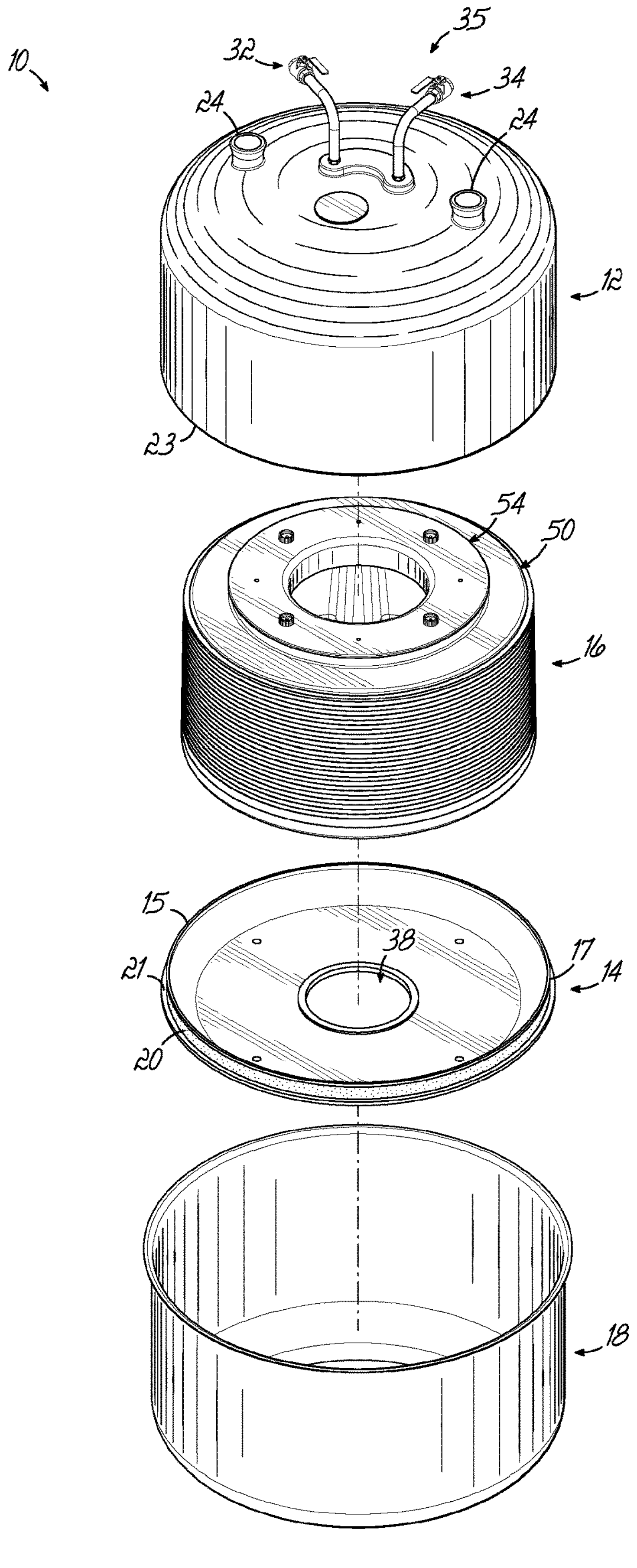
FIG. 2 is a partially disassembled perspective view of the rotor assembly of FIG. 1 depicting a cover, a rotor, a base, and a containment shell of the rotor assembly.

Embodiments of the present invention are directed to rotors for continuous processing of biological suspensions using processing containers in the form of sealed rotor assemblies. The sealed rotor assemblies enable a "plug-and-play" centrifugation system which minimizes the effort required from users of the rotor assemblies.

FIGS. 1-7 depict a continuous-flow sealed rotor assembly 10 in accordance with an embodiment of the present invention. The rotor assembly 10 includes a housing 11 comprising a cover 12 and a base 14, a rotor 16, and a containment shell 18. The base 14 may include a circumferential rim 15 having an outer surface with a rabbet 17. The cover 12 may have an opening 19 slightly larger in diameter than the circumferential rim 15. The diameter of opening 19 may allow the cover 12 to be coupled to the base 14 by an elastic member 20 (e.g., a gasket) that provides a friction fit between an inner surface of the cover 12 and the rabbet 17 of base 14. The cover 12 and base 14 may thereby be operatively coupled to each other so that the housing 11 provides a sealed chamber 22 for containing the rotor 16.

Figure 6:
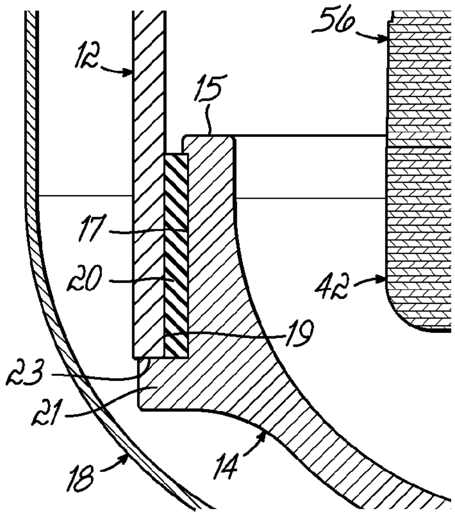
FIG. 6 is an enlarged view of a portion of the rotor assembly of FIG. 5 showing additional details thereof.

As best shown by FIG. 6, a flange 21 defined by the rabbet 17 may provide a stop for a lower edge 23 of the cover 12 so that the cover 12 is positively located relative to the base 14 in the axial direction. The cover 12 may include one or more handles 24 and a reinforcing plate 26 having a plurality of (e.g., two) threaded bores 28, 30. The threaded bores 28, 30 may be configured to receive a feed assembly 32 and a decanting assembly 34, respectively. The reinforcing plate 26, feed assembly 32, and decanting assembly 34 may comprise a liquid transport assembly 35 for feeding and decanting liquid media into and out of the rotor assembly 10.

The base 14 may be coupled to the containment shell 18 by one or more fasteners 36, e.g., nuts and bolts. The base 14 and containment shell 18 may each include a respective center hole 38, 40 through which the rotor 16 may be coupled to a centrifuge. The center holes 38, 40 may enable the rotor 16 to rotate within the sealed chamber 22 while the housing 11 and containment shell 18 remain stationary. The containment shell 18 may be configured to collect any materials that leak out of the sealed chamber 22.

Figure 3:
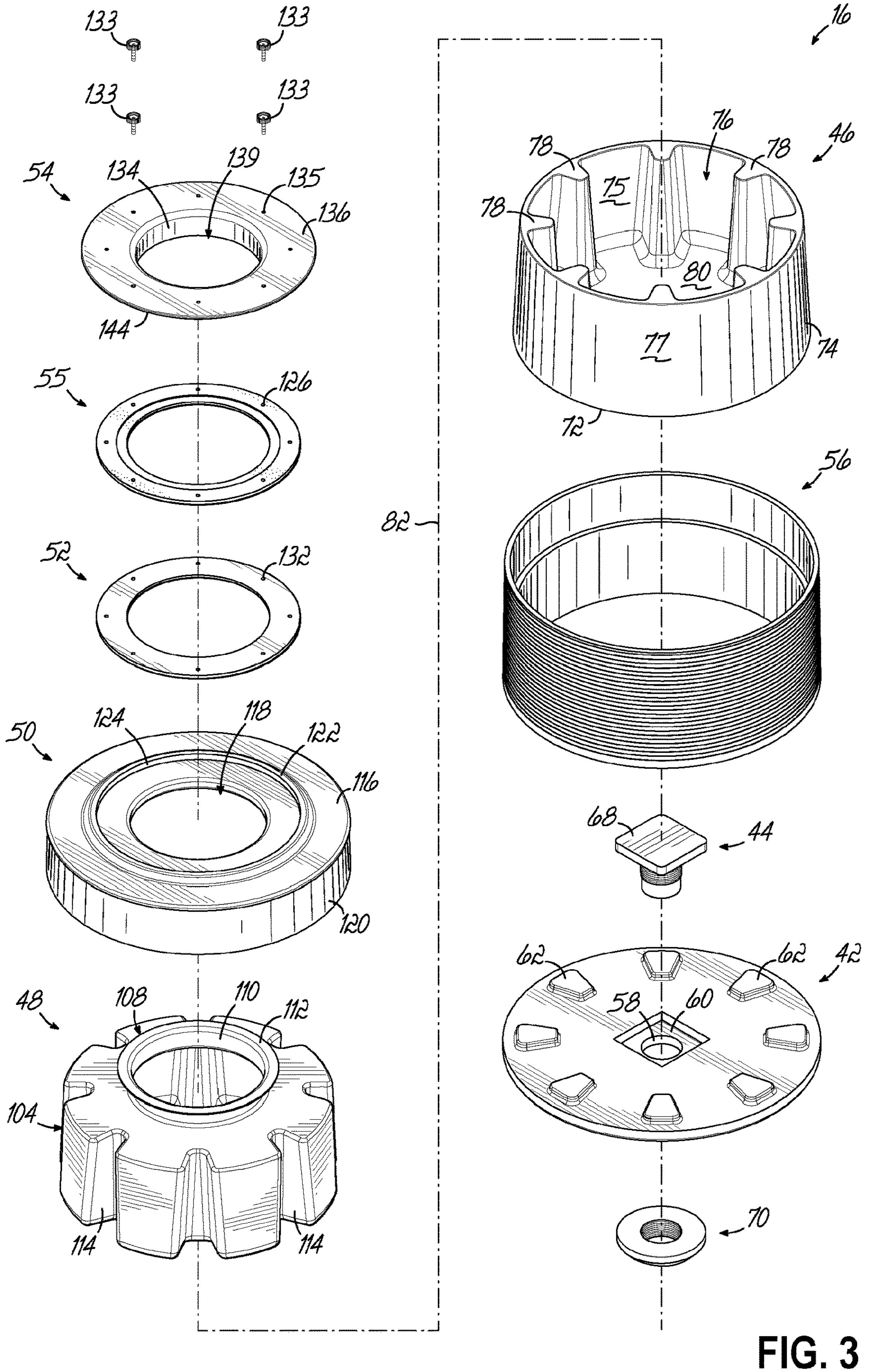
FIG. 3 is a disassembled perspective view of the rotor of FIG. 2.
Figure 4:
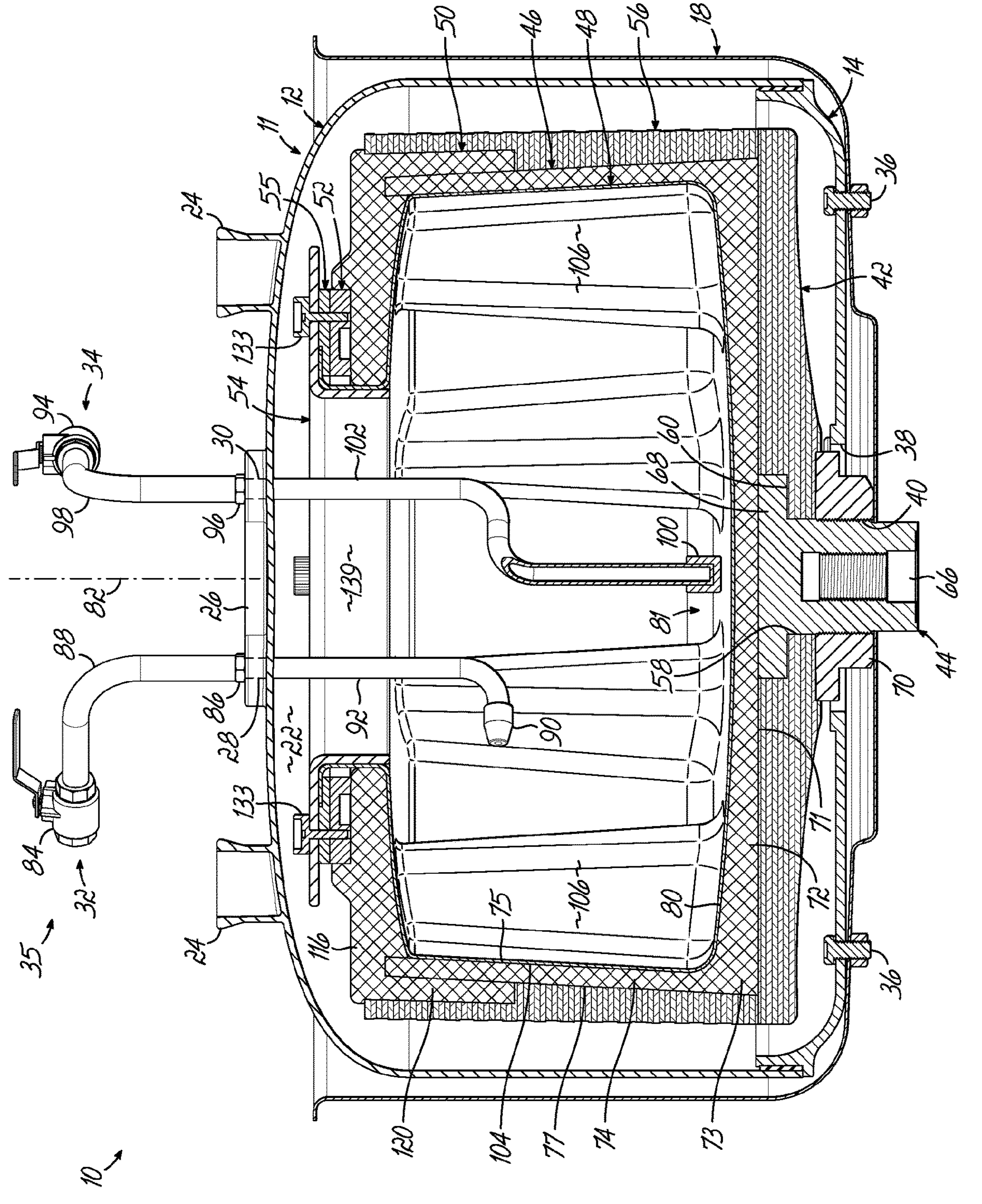
FIG. 4 is a schematic cross-sectional view of the rotor assembly of FIG. 1.
Figure 5:
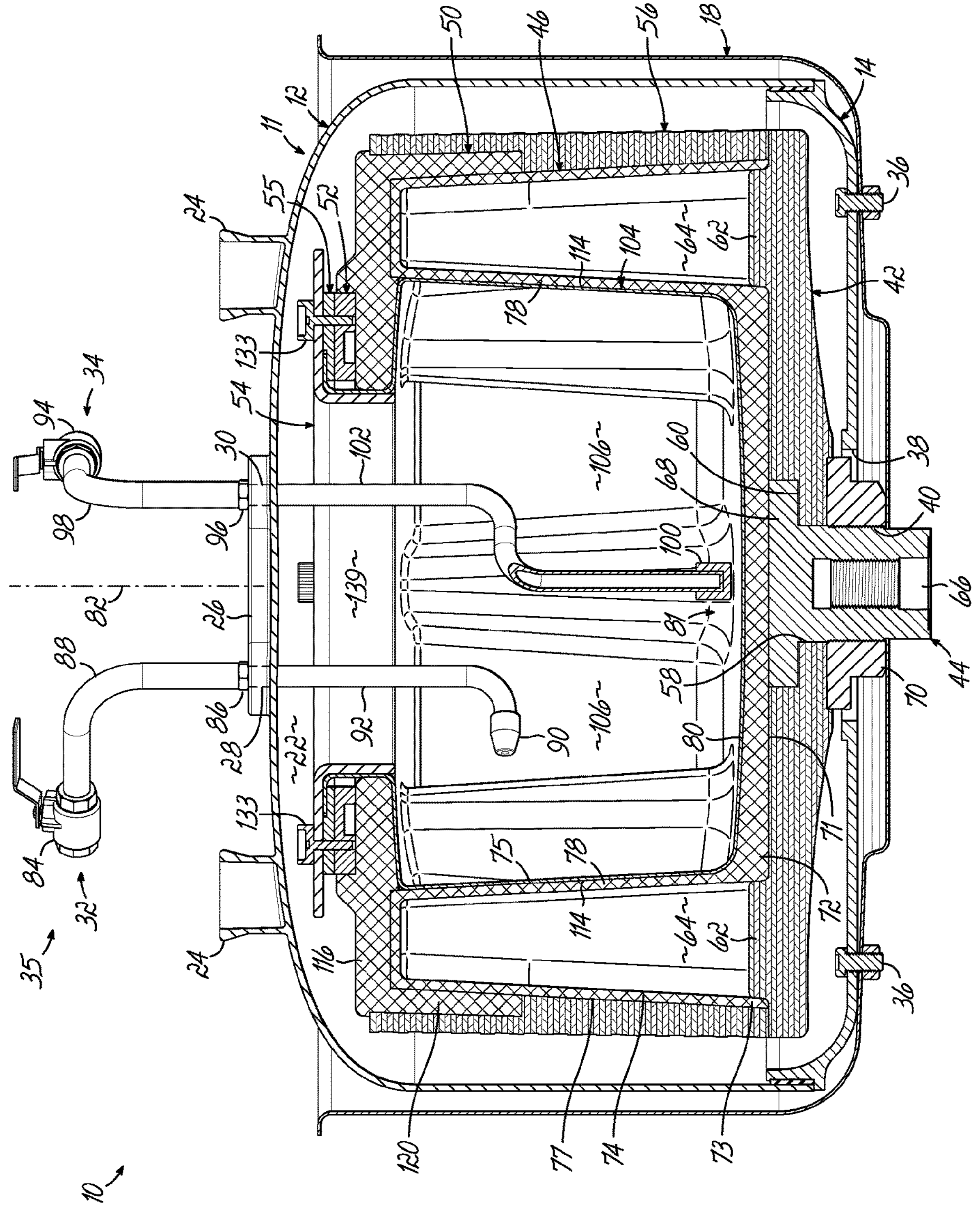
FIG. 5 is another schematic cross-sectional view of the rotor assembly of FIG. 1 showing additional details not clearly visible in FIG. 4.

As best shown by FIGS. 3-5, the rotor 16 may include a torque transfer module 42, a drive hub 44, a drum 46, a bio-process bag 48, a pressure ring 50, a retaining ring 52, a holder 54, a compression ring 55, and a reinforcement 56. The torque transfer module 42 may serve as both a pressure plate and torque transfer member. The torque transfer module 42 may include a center hole 58, a keyed recess 60 centered on the center hole 58, and an upper surface having plurality of projections 62 configured to engage matching recesses 64 in the drum 46 as shown in FIG. 5.

The drive hub 44 may include a bore 66 configured to receive a spindle of the centrifuge, and a keyed flange 68 configured to engage the keyed recess 60 of torque transfer module 42. A threaded portion of the drive hub 44 may be configured to receive a retaining nut 70. The retaining nut 70 may be configured to threadedly engage the threaded portion of drive hub 44. In response to tightening the retaining nut 70, a portion of the torque transfer module 42 that provides a lower surface of the keyed recess 60 may be compressed between the keyed flange 68 of drive hub 44 and an upper surface of retaining nut 70. The rotor 16 may thereby be securely coupled to the drive hub 44 by the retaining nut 70.

The drum 46 may include a generally circular base 72 having an upper surface 80, a lower surface 71, an outer rim 73, and a circumferential wall 74 having an inner surface 75 and an outer surface 77 (see FIGS. 3-5). The circumferential wall 74 may project generally upward from the outer rim 73 to define an opening 76 (FIG. 3), and may be angled inward such that the opening 76 of drum 46 has a smaller diameter than the base 72 of drum 46. A plurality of axially-aligned baffles 78 may project radially inward from the inner surface 75 of circumferential wall 74. Each baffle 78 of drum 46 may be hollow and include an opening at the base thereof that provides a recess 64 which engages a respective projection 62 of torque transfer module 42, as described above and shown in FIG. 5.

The upper (or inner) surface 80 of base 72 may have a shallow upwardly-facing bowl shape that defines a catchment 81 proximate to an axis of rotation 82 of rotor assembly 10, as shown in FIGS. 4 and 5. To this end, the upper surface 80 may have a radial slope that is generally zero (i.e., is generally flat in the horizontal plane) proximate to the center of the base 72 of drum 46. The radial slope may increase with increasing radial distance from the center of the base 72 such that a liquid medium contained by the drum 46 would be urged toward the center of the base 72 by gravity when the rotor assembly 10 is stationary.

The feed assembly 32 may include an input port in the form of a feed valve 84 (e.g., a ball-valve) coupled to an inlet of a feed fitting 86 by an exterior feed tube 88. The feed assembly 32 may include an outlet port in the form of a nozzle 90 coupled to an outlet of the feed fitting 86 by an interior feed tube 92. The interior feed tube 92 may be configured to orient the nozzle 90 so that it dispenses liquid media in a direction that is generally outward from the axis of rotation 82.

The decanting assembly 34 may include an output port in the form of a decanting valve 94 (e.g., a ball-valve) coupled to an outlet of a decanting fitting 96 by an exterior decanting tube 98, and an input port 100 that is fluidically coupled to an inlet of the decanting fitting 96 by an interior decanting tube 102. The interior decanting tube 102 may be configured so that the input port 100 of decanting assembly 34 is optimally positioned to remove a liquid medium (e.g., a supernatant) during a centrifugation process. For example, the interior decanting tube 102 may be configured to position the input port 100 of decanting assembly 34 proximate to the catchment 81 of drum 46. Advantageously, by the catchment 81 may enable the decanting assembly 34 to decant of a larger percentage of a liquid medium from the rotor 16 than would be possible with a rotor lacking this feature by allowing the input port 100 to be positioned lower in the rotor 16 and by concentrating the liquid medium around the input port 100.

As shown in FIGS. 3-5, the bio-process bag 48 may include a lower portion 104 and an upper portion 108. The lower portion 104 of bio-process bag 48 may include a plurality of interior pockets 106. The upper portion 108 of bio-process bag 48 may include an axially-aligned neck 110 and a radially-aligned skirt 112 that extends outward from the top of the neck 110. The neck 110 of bio-process bag 48 may define an opening through which liquid media can be added to, and processed components of the liquid media removed from, the bio-process bag 48. Exterior pockets 114 between adjacent interior pockets 106 of bio-process bag 48 may be configured to engage the baffles 78 of drum 46. This engagement may prevent the bio-process bag 48 from shifting or rotating relative to the drum 46 as the rotor 16 is subjected to angular acceleration by the centrifuge.

Figure 7:
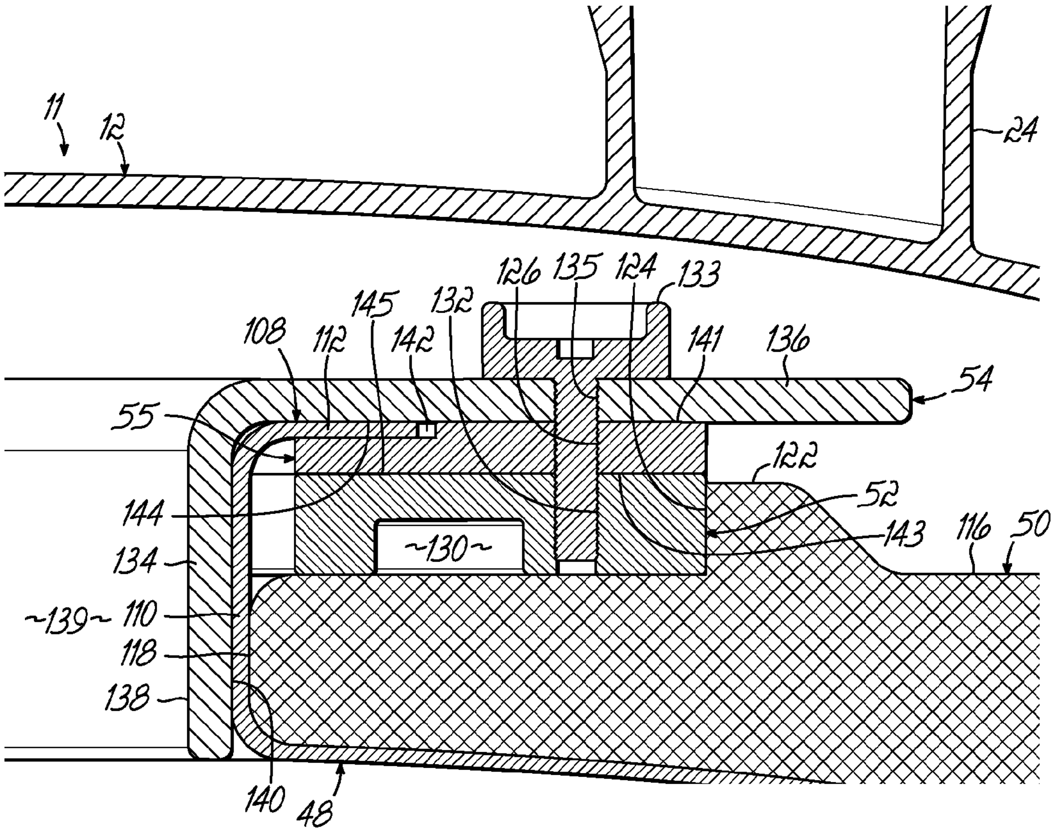
FIG. 7 is an enlarged view of another portion of the rotor assembly of FIG. 5 showing additional details thereof.

As best shown by FIG. 7, the pressure ring 50 may include a radially-aligned flange 116 that defines an opening 118, and a circumferential wall 120 that extends generally downward from an outer edge of the flange 116. The opening 118 may be configured to receive the axially-aligned neck 110 of bio-process bag 48. A circumferential ridge 122 centered on the axis of rotation 82 of rotor assembly 10 may project upward from an upper surface of the flange 116. The circumferential ridge 122 may include an axially-aligned inwardly-facing surface 124 configured to center the retaining ring 52 about the opening 118 of pressure ring 50.

The retaining ring 52 may include a circumferential channel 130 on a lower face thereof, and a plurality of threaded holes 132 each configured to threadedly engage a retaining bolt 133. The holder 54 may include an axially-aligned circumferential wall 134 and a radially-aligned flange 136. The circumferential wall 134 may include an inwardly-facing surface 138 that defines an opening 139 of the rotor 16, and an outwardly-facing surface 140 that engages the neck 110 of bio-process bag 48. The flange 136 may be joined to and extend radially outward from an upper portion of the circumferential wall 134, and include a plurality of pass-through holes 135 configured to pass the retaining bolts 127.

The compression ring 55 may include an upper surface 141, a lower surface 143, and a plurality of pass-through holes 126 configured to pass the retaining bolts 133. The upper surface 141 of compression ring 55 may include vertically recessed annulus 142 that is open to the axial side of the compression ring 55. The vertically recessed annulus 142 may work cooperatively with a lower surface 144 of the flange 136 of holder 54 to provide a radially-aligned circumferential channel that receives at least an outer portion of the skirt 112 of bio-process bag 48.

The retaining ring 52 and holder 54 may be configured to work in cooperation with the pressure ring 50 and compression ring 55 to secure the bio-process bag 48 within the rotor 16. The compression ring 55 may be subject to a compressive force between an upper surface 145 of the retaining ring 52 and the lower surface 144 of flange 136 when the retaining bolts 133 are tightened while in threaded engagement with the threaded holes 132 of retaining ring 52. This compressive force may secure the skirt 112 of bio-process bag 48 between the vertically recessed annulus 142 of compression ring 55 and the lower surface 144 of flange 136. The outwardly-facing surface 140 of circumferential wall 134 may press the neck 110 of bio-process bag 48 against the pressure ring 50 and insure a full and even insertion of the skirt 112 of bio-process bag 48 into the circumferential channel defined between the compression ring 55 and flange 136 of holder 54.

The reinforcement 56 may include one or more helical windings that extend around the circumferential walls 74, 120 of drum 46 and pressure ring 50. The reinforcement 56 may be formed by a filament winding process followed by a compression molding process using a suitable material, such as an epoxy-coated carbon fiber. For example, the reinforcement 56 may be compression molded onto the rotor 16 after placing layers of resin-coated carbon fiber laminate material, or winding one or more strands of carbon fiber, onto the outwardly-facing surface of circumferential wall 74. The reinforcement 56 may be configured to bear the majority of the centrifugal forces placed on the rotor 16. Methods of forming reinforcements for centrifugal rotors using a filament winding process are described in detail by U.S. Pat. No. 8,323,169, issued Dec. 4, 2012, the disclosure of which incorporated by reference herein in its entirety.

FIGS. 8-17 depict a continuous-flow sealed rotor assembly 150 in accordance with an alternative embodiment of the present invention in which like reference numbers refer to like components of rotor assembly 10. The rotor assembly 150 includes a housing 151 comprising the base 14 and a cover 152, a rotor 154, and a containment shell 156.

Figure 8:
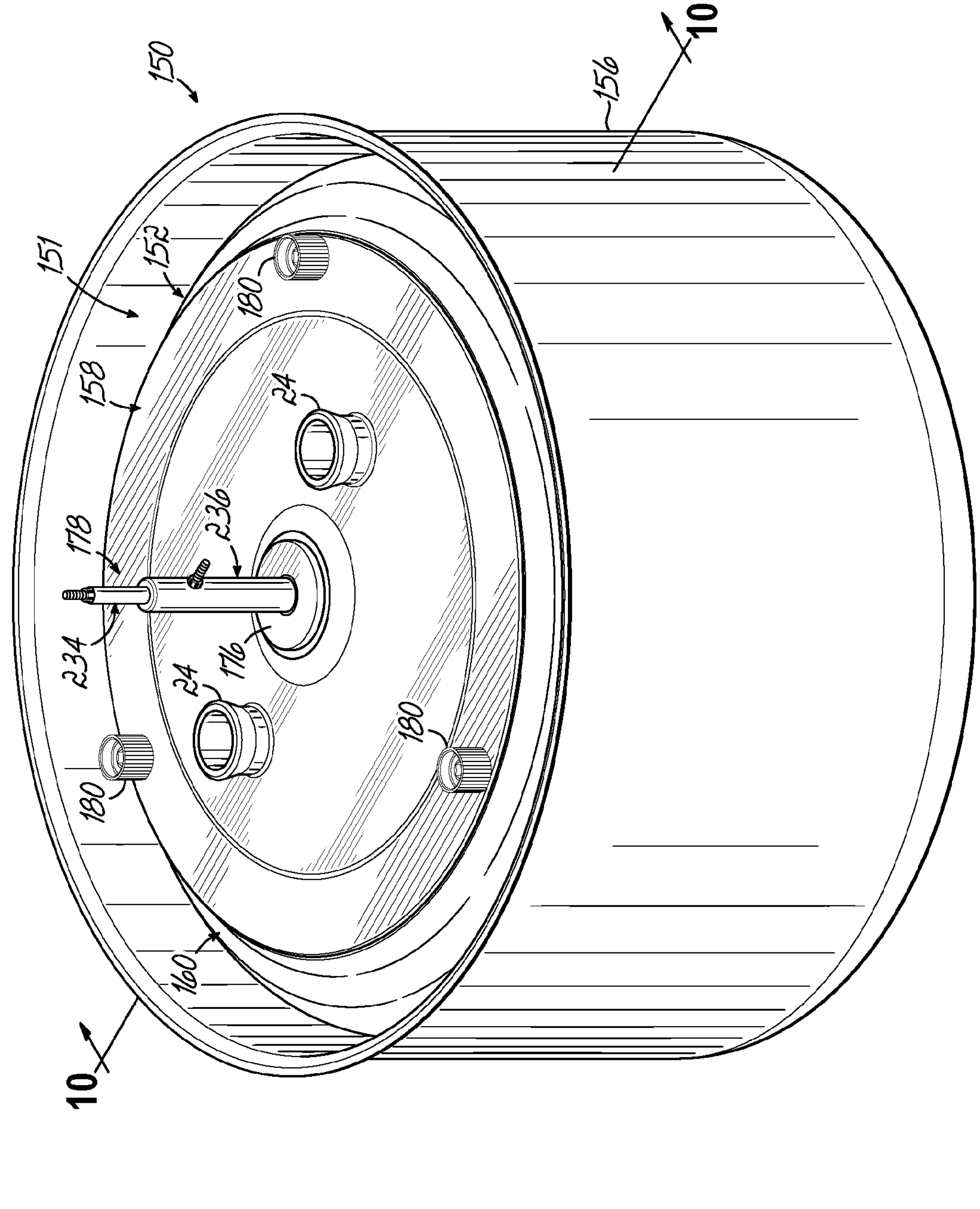
FIG. 8 is a perspective view of a continuous-flow sealed rotor assembly in accordance with another embodiment of the present invention.
Figure 9:
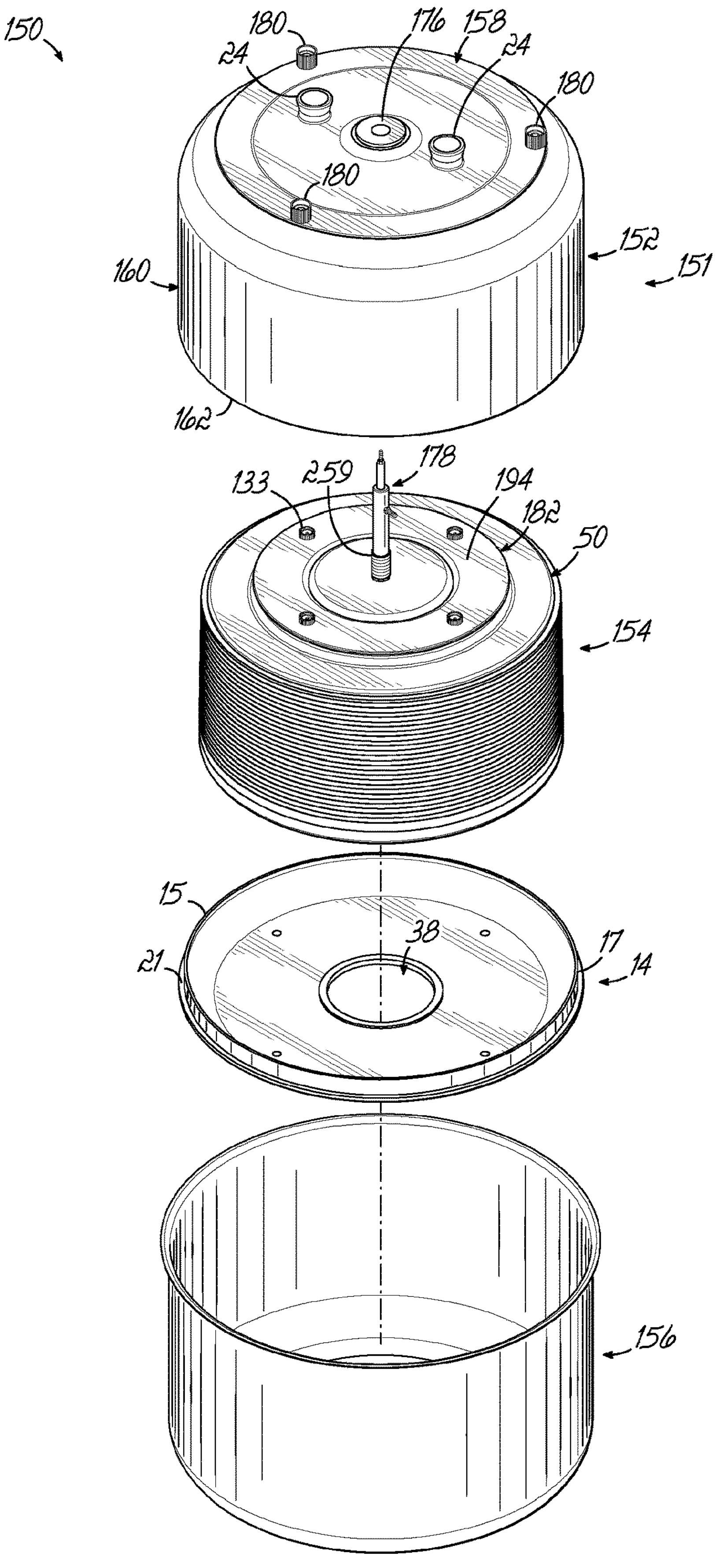
FIG. 9 is a partially disassembled perspective view of the rotor assembly of FIG. 8 depicting a cover, a rotor, a base, and a containment shell of the rotor assembly.
Figure 10:
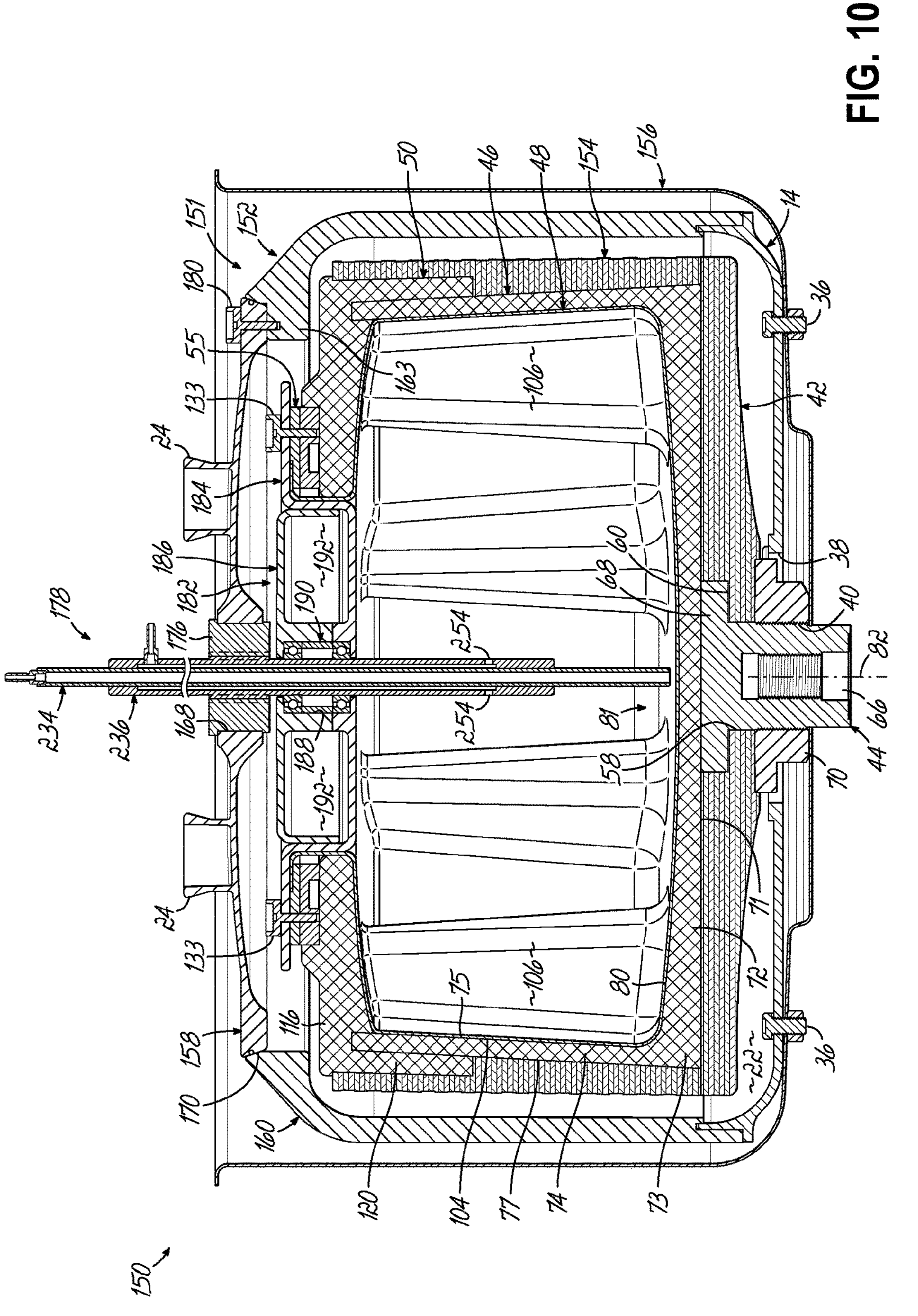
FIG. 10 is a schematic cross-sectional view of the rotor assembly of FIG. 8.
Figure 11:
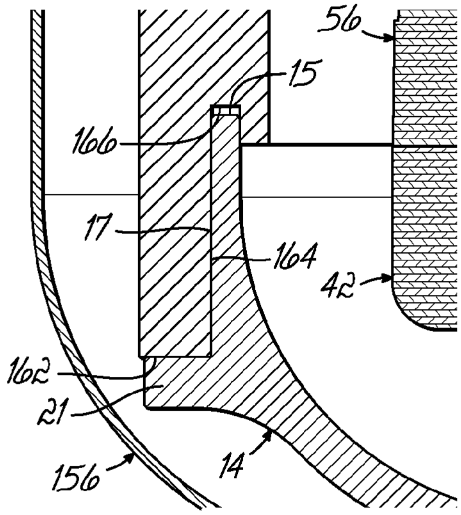
FIG. 11 is an enlarged view of a portion of the rotor assembly of FIG. 10 showing additional details thereof.

As best shown by FIGS. 8-10, the cover 152 may include a cap 158 and a barrel 160. The barrel 160 may include an upper edge 161, a lower edge 162, and one or more flanges 163, e.g., three flanges. Each flange 163 may include a threaded bore 165 and extend radially inward from the upper edge 161 of barrel 160. As best shown by FIG. 11, a circumferential rabbet 164 may be located on an inwardly-facing surface of the barrel 160 proximate to the lower edge 162 thereof. The circumferential rabbet 164 may include a circumferential groove 166 in a radially-aligned surface of the circumferential rabbet 164. The circumferential groove 166 may be configured to receive the circumferential rim 15 of base 14. The flange 21 of base 14 may provide a stop for the lower edge 162 of barrel 160.

The circumferential rabbet 164 and circumferential groove 166 may operate cooperatively to position the barrel 160 both axially and radially relative to the base 14 when the barrel 160 is operatively coupled to the base 14. Advantageously, embodiments of the present invention having the circumferential rabbet 164 and circumferential groove 166 configuration may avoid using an elastic member (e.g., elastic member 20) to couple the cover 152 to the base 14.

Figure 12:
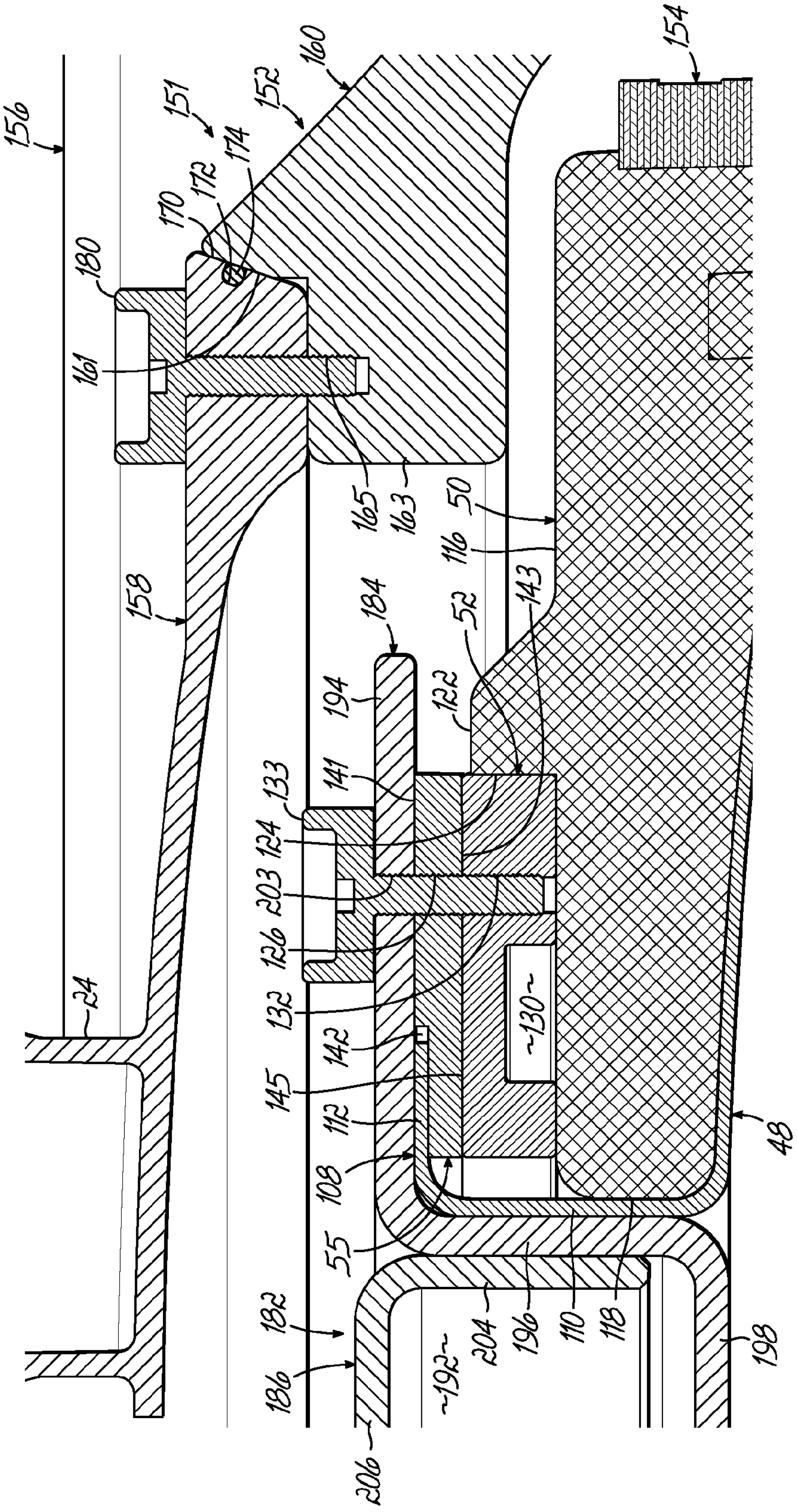
FIG. 12 is an enlarged view of another portion of the rotor assembly of FIG. 10 showing additional details thereof.
Figure 13:
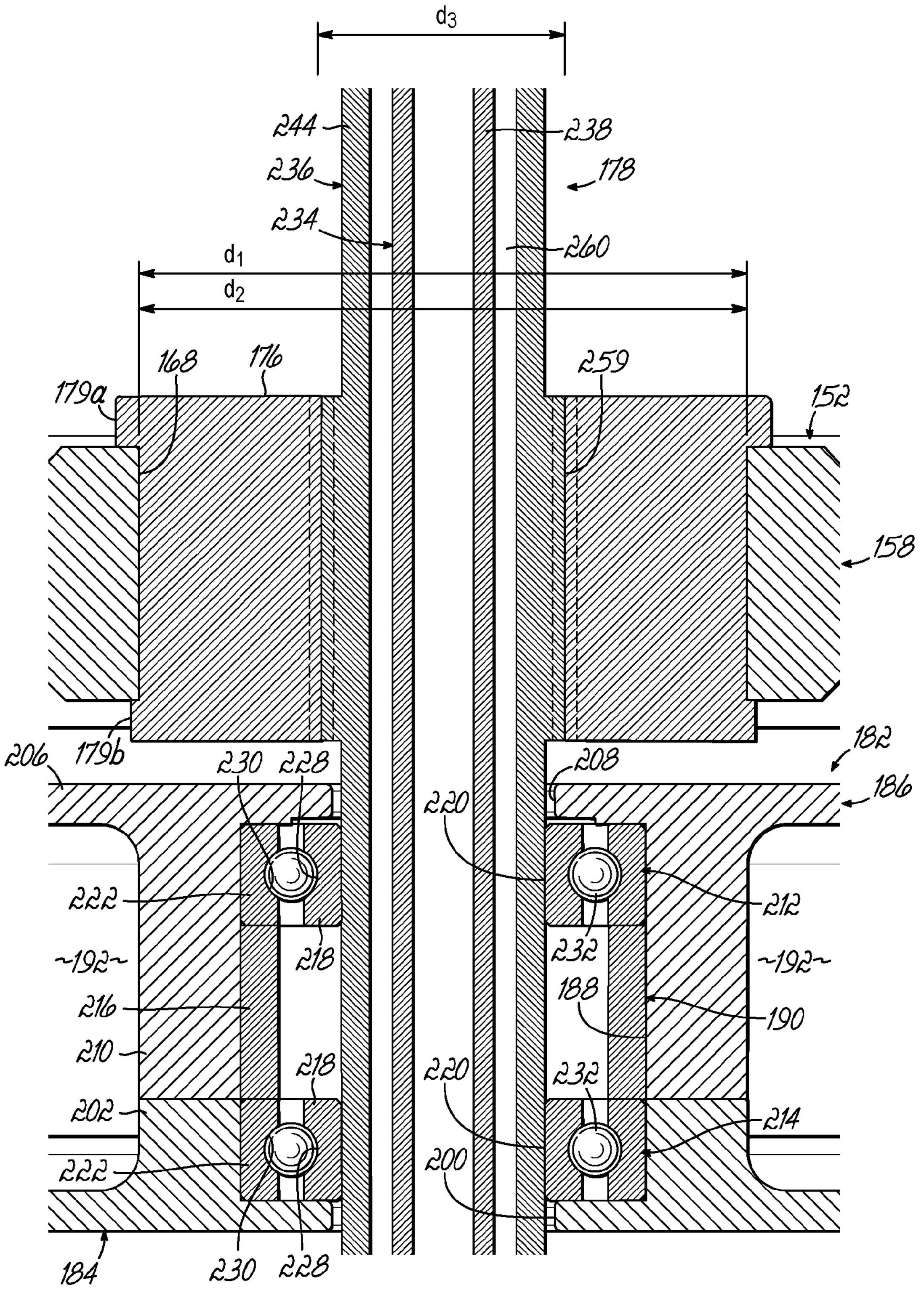
FIG. 13 is an enlarged view of yet another portion of the rotor assembly of FIG. 10 showing additional details thereof.

As best shown by FIGS. 12 and 13, the cap 158 may include a center hole 168 having a diameter $d_1$ and a circumferential edge 170 having a groove 172 configured to receive an elastic member 174, e.g., an O-ring. The center hole 168 may be configured to receive a bushing 176 that positions a liquid transport assembly 178 relative to the cap 158, e.g., by centering the liquid transport assembly 178 in the center hole 168. To this end, the bushing 176 may have an outer diameter $d_2$ about the same size as the diameter $d_1$ of center hole 168, an inner diameter $d_3$ configured to provide a friction fit with the liquid transport assembly 178, and upper and lower flanges 179*a*, 179*b* that extend radially beyond the outer diameter $d_2$ and which locate the bushing 176 axially relative to the cap 158. The cap 158 may be operatively coupled to the barrel 160 by fasteners 180 (e.g., bolts) which threadedly engage the threaded bores 165 in the flanges 163 of barrel 160. The elastic member 174 may provide a fluid-tight seal so that, once assembled, the base 14, cap 158, and barrel 160 form the housing 151 which provides the sealed chamber 22 in which the rotor 154 rotates.

Figure 16:
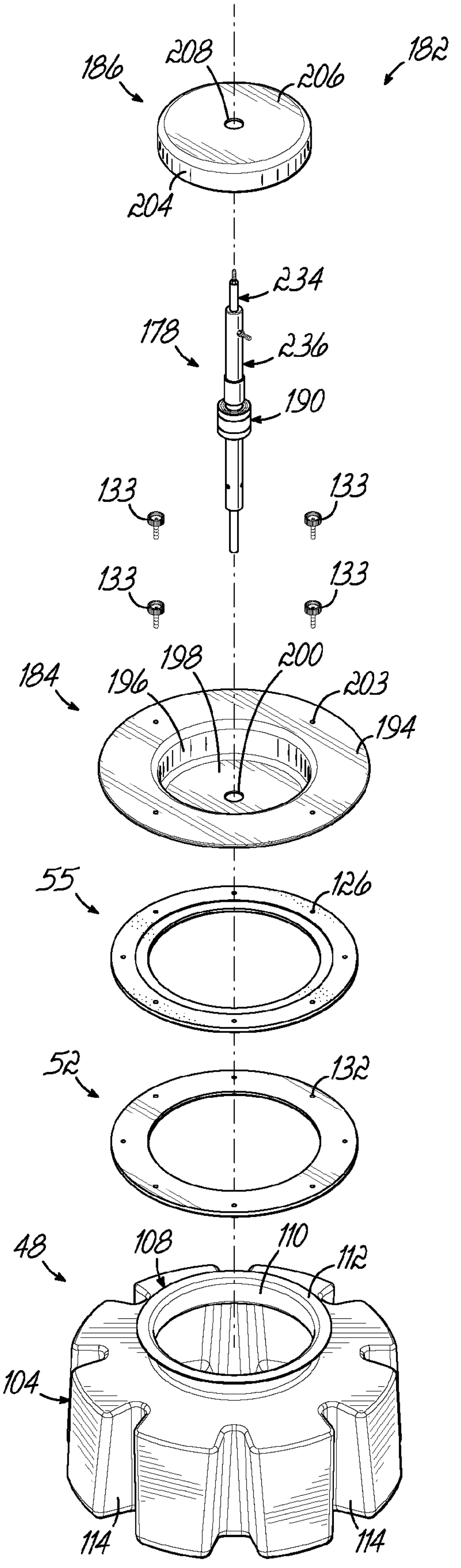
FIG. 16 is a disassembled perspective view of the sub-assembly of FIG. 15.
Figure 17:
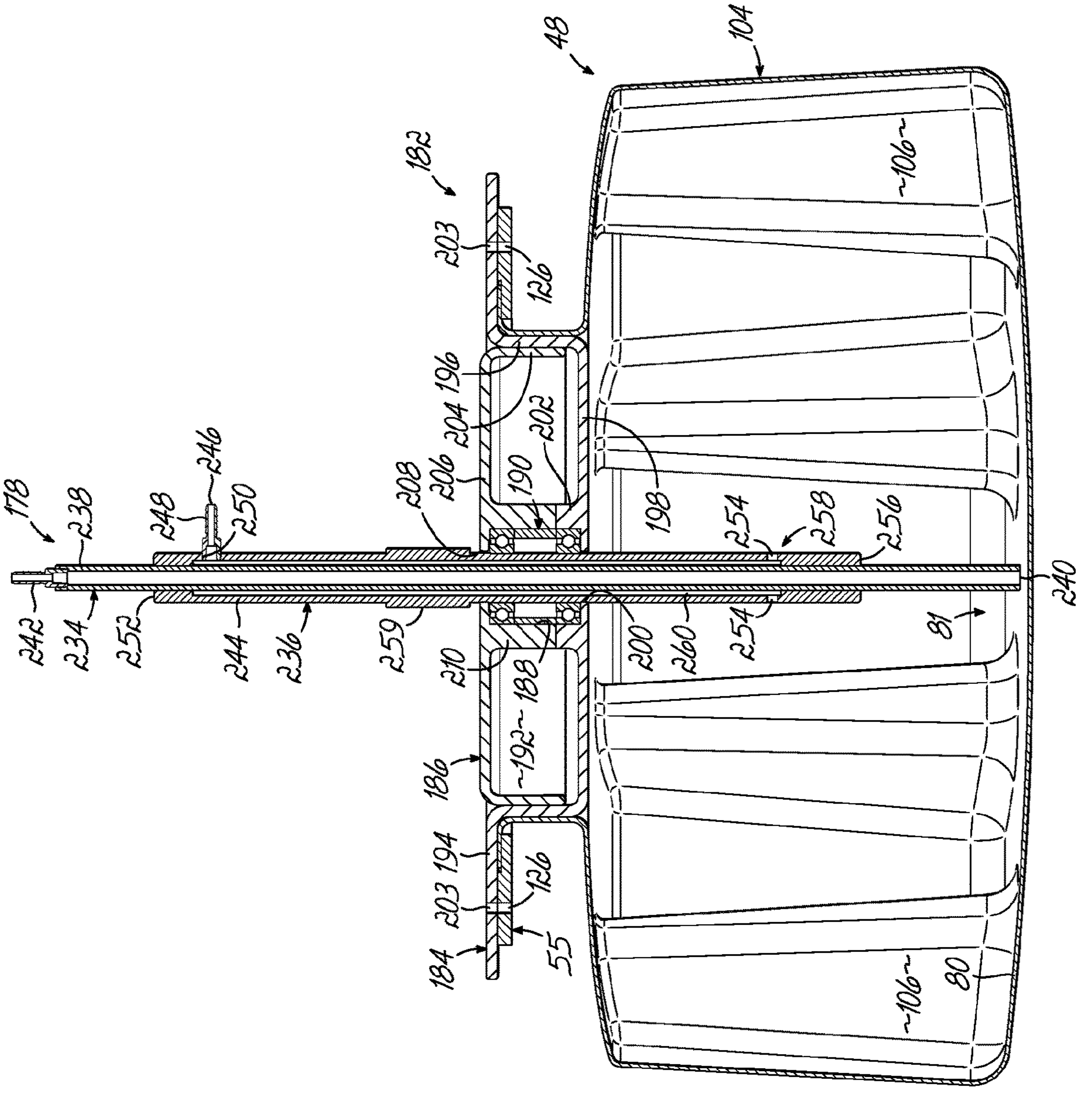
FIG. 17 is a schematic cross-sectional view of the sub-assembly of FIG. 15.
Figure 18:
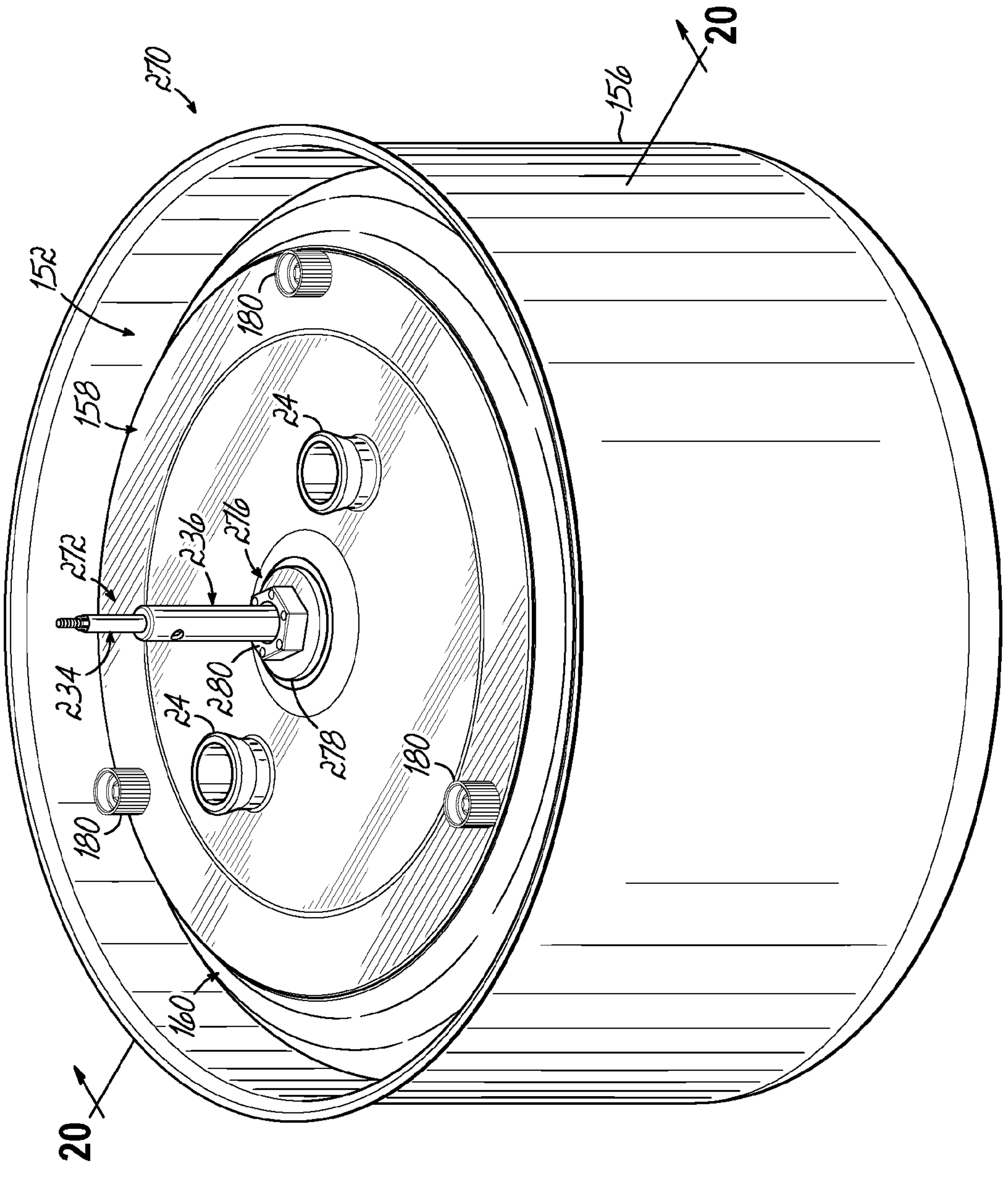
FIG. 18 is a perspective view of a continuous-flow sealed rotor assembly in accordance with yet another embodiment of the present invention.
Figure 19:
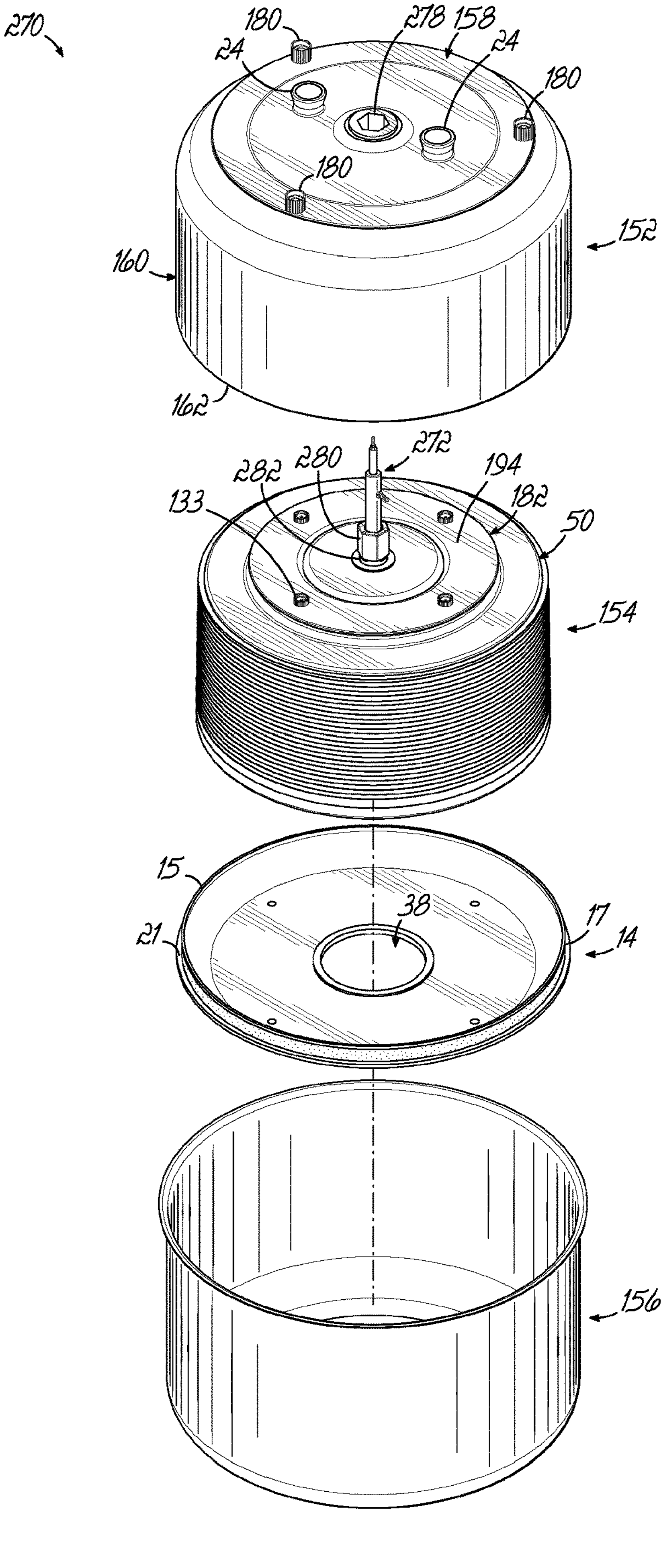
FIG. 19 is a partially disassembled perspective view of the rotor assembly of FIG. 18 depicting a cover, a rotor, a base, and a containment shell of the rotor assembly.

As best shown by FIGS. 10, 16, and 17, the rotor 154 may include a holder 182 having a lower section 184 and an upper section 186. When operatively coupled together, the lower section 184 and upper section 186 of holder 182 may define a central cavity 188 that is configured to contain a bearing assembly 190, and an annular cavity 192 that encircles the central cavity 188.

The lower section 184 of holder 182 may include an axially-aligned circumferential wall 196, a radially-aligned flange 194 that extends radially outward from an upper portion of the circumferential wall 196, and a lower plate 198 that is coupled to a lower portion of the circumferential wall 196. The lower plate 198 may include a central opening 200 through which the liquid transport assembly 178 can be inserted. A lower portion of the central cavity 188 may be defined by a cylindrical annulus 202 that projects upward from the lower plate 198. The flange 194 may include one or more (e.g., four) holes 203 configured to pass the shafts of retaining bolts 133. The retaining bolts 133 may operatively couple the lower section 184 to the retaining ring 52 by engaging the threaded holes 132 thereof.

The upper section 186 of holder 182 may include a circumferential wall 204 and an upper plate 206. The upper plate 206 may be coupled to an upper portion of the circumferential wall 204. The diameter of the circumferential wall 204 may be such that the circumferential wall 204 of upper section 186 fits within the circumferential wall 196 of lower section 184. The upper plate 206 may include a central opening 208 through which the liquid transport assembly 178 can be inserted. A cylindrical annulus 210 may project downward from the upper plate 206 to define an upper portion of the central cavity 188.

The holder 182 may be configured so that, when assembled, the central opening 208 of upper plate 206 is axially-aligned with the central opening 200 of lower plate. This alignment may allow the liquid transport assembly 178 to be inserted through the holder 182 so that a lower portion of the liquid transport assembly 178 projects into the bio-process bag 48 when the holder 182 is positioned in the rotor assembly 150. The cylindrical annulus 202 of lower plate 198 and the cylindrical annulus 210 of upper plate 206 may also align axially to define the central cavity 188. The upper section 186 of holder 182 may be held in place against the lower section 184 of holder 182 by pressure applied to the upper section 186 by a lower surface of bushing 176, by a friction fit with the liquid transport assembly 178, or by any other suitable means.

The bearing assembly 190 may be configured to facilitate rotation of the rotor 154 around the liquid transport assembly 178 during operation of the centrifuge. To this end, and as best shown by FIG. 13, the bearing assembly 190 may include an upper bearing 212 and a lower bearing 214 axially separated by a cylindrical spacer 216. Each bearing 212, 214 may include an inner ring 218 that provides a bore 220 and an outer ring 222 that positions the bearing 212, 214 within the central cavity 188. The bore 220 of each bearing 212, 214 may be configured to allow the liquid transport assembly 178 to pass through the bearing assembly 190.

The inner ring 218 and the outer ring 222 may each have an upper face and a lower face. The outer rings 222 of bearings 212, 214 may be so sized and shaped as to hold the bearing assembly 190 in place radially through contact with a vertical surface of the central cavity 188. The cylindrical spacer 216 may have a length such that the upper face of upper bearing 212 and the lower face of lower bearing 214 engage respective horizontal surfaces of central cavity 188. The bearing assembly 190 may thereby be held in place axially by the upper and lower horizontal surfaces of central cavity 188.

Each bearing 212, 214 may be configured to allow the inner ring 218 and outer ring 222 to rotate relative to each other. To this end, the inner ring 218 may have an inner race 228 and the outer ring 222 may have an outer race 230 that operate cooperatively to contain respective bearing members 232, e.g., balls, rollers, etc. The bearing members 232 contained by the inner and outer races 228, 230 may be maintained in a generally fixed position relative to each other by one or more of a cage and a guide ring (not shown).

Figure 14:
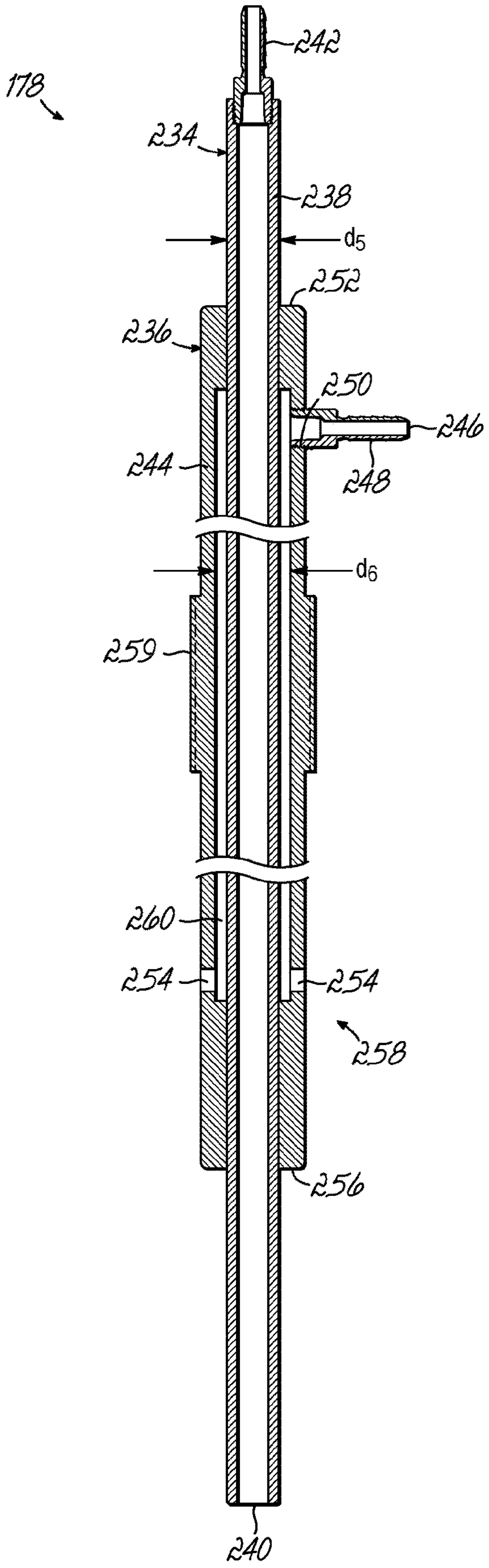
FIG. 14 is a schematic cross-sectional view of a liquid transport assembly of the rotor of FIG. 10.
Figure 15:
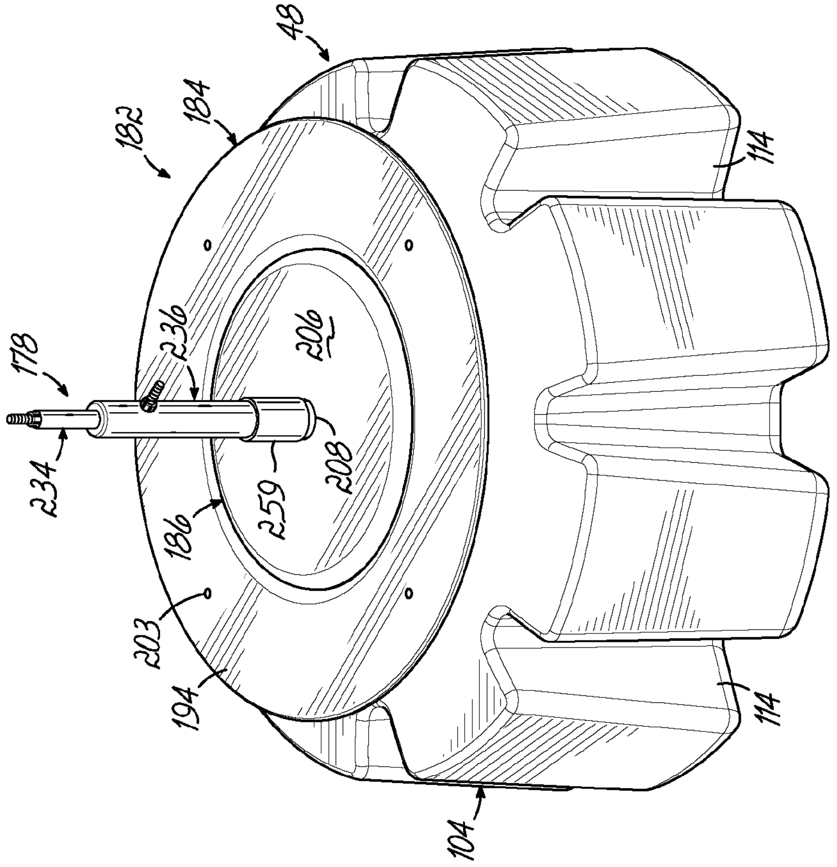
FIG. 15 is a perspective view of a sub-assembly of the rotor assembly of FIG. 8 including the liquid transport assembly, a bio-process bag, and a holder.

As best shown by FIGS. 10 and 14, the liquid transport assembly 178 may include a decanting assembly 234 and feed assembly 236. The decanting assembly 234 may include a decanting tube 238 having an input port 240 (e.g., an opening) at a lower end thereof, and an output port 242 (e.g., a barbed nozzle) at an upper end thereof. The decanting tube 238 may extend into the bio-process bag 48 a distance sufficient to optimally position the input port 240 to remove liquid media (e.g., supernatant) during centrifugation, e.g., so that the input port 240 is proximate to the catchment 81 of drum 46.

The feed assembly 236 may include a feed tube 244 operatively coupled to an input port 246. The input port 246 of feed assembly 236 may include a fitting 248 (e.g., a barbed nozzle) coupled to the interior of feed tube 244 though a lateral opening 250. The lateral opening 250 may be proximate to an upper end 252 of feed tube 244. The fitting 248 may be configured to receive a flexible tube through which a liquid medium (e.g., a biological suspension) is provided to the rotor assembly 150. One or more (e.g., three) lateral openings 254 proximate to a lower end 256 of feed tube 244 may provide an output port 258 through which the liquid medium can be provided to the bio-process bag 48. The output port 258 of feed assembly 236 may be configured so that the liquid medium is dispensed into the bio-process bag 48 in an outwardly-facing radial direction.

A section of the feed tube 244 positioned between (e.g., approximately midway between) the upper end 252 and the lower end 256 of feed tube 244 may include an integral collar 259 having an outer diameter larger than the upper and lower portions of the feed tube 244. The integral collar 259 of feed tube 244 may provide a friction fit between the feed tube 244 and the inner surface of bushing 176. The integral collar 259 may facilitate passage of the lower portion of liquid transport assembly 178 through the bushing 176 by allowing this section of the feed tube 244 to have an outer diameter smaller than the inner diameter of bushing 176.

The decanting tube 238 may pass longitudinally through the feed tube 244 and have an outer diameter $d_5$ less than an inner diameter $d_6$ of the feed tube 244 along at least a portion thereof. The decanting tube 238 and feed tube 244 may thereby define an annular channel 260 between the outer surface of decanting tube 238 and the inner surface of feed tube 244. The annular channel 260 may fluidically couple the input port 246 of feed assembly 236 to the output port 258 of feed assembly 236.

The inner diameter of feed tube 244 may be reduced proximate to its upper and lower ends 252, 256. This reduced inner diameter may result in the inner surface of feed tube 244 coming into contact with the outer surface of decanting tube 238 proximate to the upper and lower ends of the feed tube 244. The contact between the inner surface of decanting tube 238 and outer surface of feed tube 244 may seal the upper and lower ends of the annular channel 260 so that the suspension flowing into the input port 246 of feed assembly 236 is directed through the annular channel 260 and dispensed into the bio-process bag 48 through the output port 258 of feed assembly 236. In an alternative embodiment, the upper and lower ends of the annular channel 260 may be sealed by one or more of sleeves, O-rings, increasing the outer diameter of the decanting tube 238, or any other suitable method. Thus, embodiments of the present invention are not limited to the liquid transport assemblies 178 in which the upper and lower ends of the annular channel 260 are sealed by sections of the decanting tube 238 that have a reduced inner diameter.

FIGS. 18-21 depict a continuous-flow sealed rotor assembly 270 in accordance with another alternative embodiment of the present invention in which like reference numbers refer to like components of the rotor assemblies 10, 150 described above. The rotor assembly 270 includes a liquid transport assembly 272 having an integral collar 274, and an upper seal assembly 276. The integral collar 274 may include an outer surface having a threaded portion 275 and a smooth portion 277. The seal assembly 276 may include a torque retaining hub 278, a seal drive hub 280, and an upper seal bearing 282.

The torque retaining hub 278 may be configured to be received by the center hole 168 of cap 158, made from a semi-rigid material (e.g., hard rubber), and include a center hole 279 configured to receive the seal drive hub 280. The center hole 279 of torque retaining hub 278 may have a non-circular shape, e.g., an ellipse, a polygon (e.g., a hexagon), or another suitable shape that resists rotation.

The seal drive hub 280 may include a threaded bore 284, an outer surface 286, and a lower surface 288 including one or more projections 290. The threaded bore 284 of seal drive hub 280 may be configured to threadedly engage the threaded portion 275 of integral collar 274. The outer surface 286 of seal drive hub 280 may have a non-circular cross-sectional shape (e.g., a hexagon) configured to engage the center hole of torque retaining hub 278. The non-circular shape of the outer surface 286 of seal drive hub 280 may prevent the seal drive hub 280 from rotating relative to the torque retaining hub 278.

The seal bearing 282 may comprise a circumferential ring 296 that includes an upper surface 292 having one or more notches 294 configured to receive the projections 290. Each projection 290 of seal drive hub 280 may engage a respective notch 294 of seal bearing 282, thereby preventing the seal bearing 282 from rotating relative to the seal drive hub 280. The circumferential ring 296 of seal bearing 282 may further include an inner groove 298 which locates an elastic member 300 (e.g., a silicon O-ring), and a smooth lower surface 302. The seal bearing 282 may remain in a fixed angular position about the axis of rotation 82, and press down on the upper section 186 of holder 182 as the rotor 154 rotates. The pressure provided by the seal assembly 276 may urge the drive hub 44 of rotor assembly to remain seated on the centrifuge spindle during centrifugation.

The seal drive hub 280 may be configured to conduct heat generated by friction between the lower surface 302 of seal bearing 282 and the upper section 186 of holder 182 away from the seal bearing 282. To increase the thermal conductivity of the seal drive hub 280, the seal drive hub 280 may include imbedded heat pipes. Additional features that may be included in embodiments of the present invention for controlling heat in the seal bearing 282 may include adjusting the amount of torque on the seal drive hub 280, or using high temperature materials in the seal bearing 282.

Advantageously, the seals provided by the seal assembly 276 both inside and outside the rotor 154 may prevent feed discharge due to rotation of the rotor 154. The seal assembly 276 may be part of a disposable rotor assembly, in which case the seal bearing 282 may only need to have an operational lifetime sufficient to process enough suspension to fill the bio-process bag 48 to capacity with pellet, e.g., about six hours of operation. To reduce costs, the seal assembly 276 may comprise molded plastics, e.g., injection molded plastic components that provide a "snap together" design.

Figure 20:
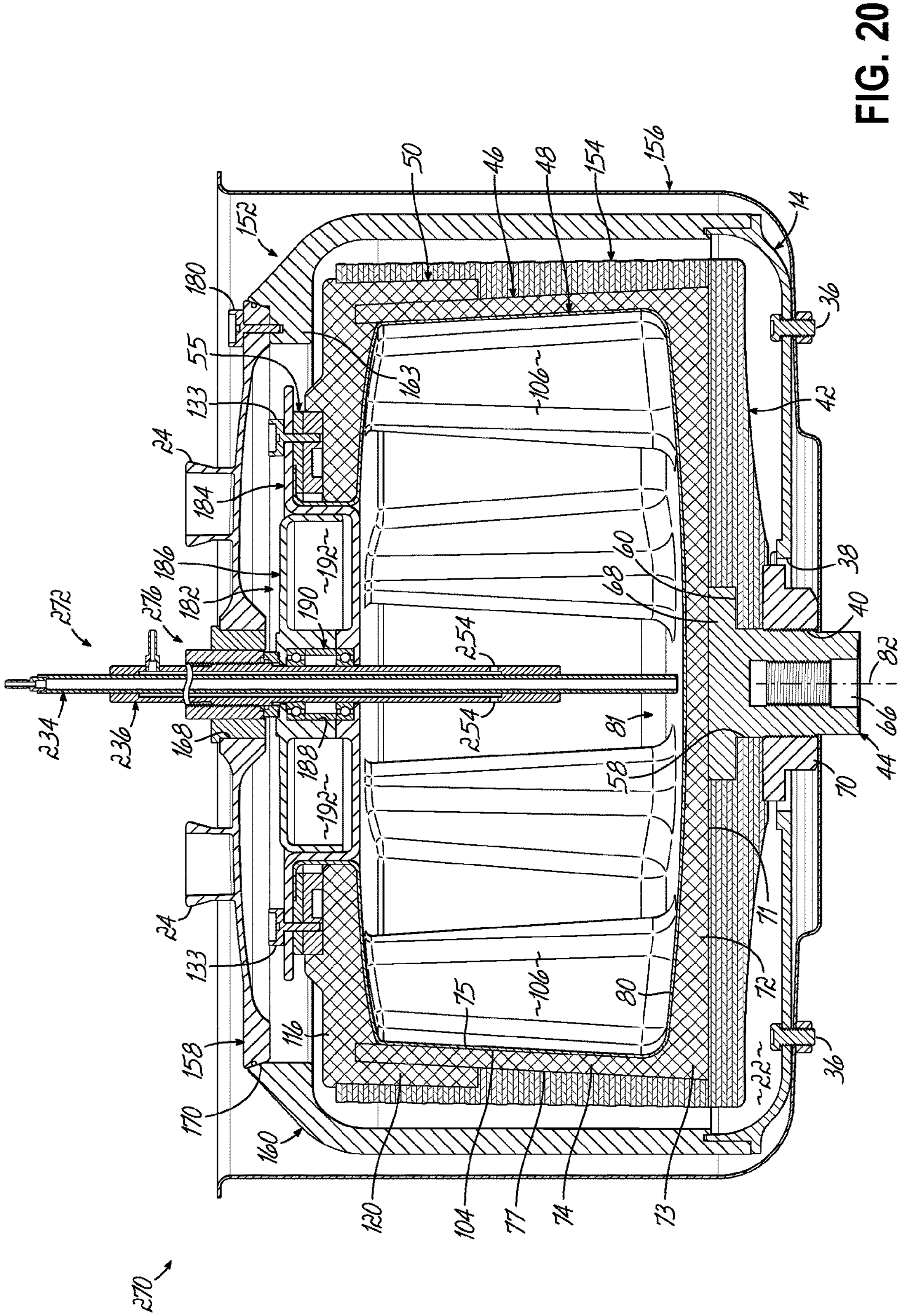
FIG. 20 is a schematic cross-sectional view of the rotor assembly of FIG. 18.
Figure 21:
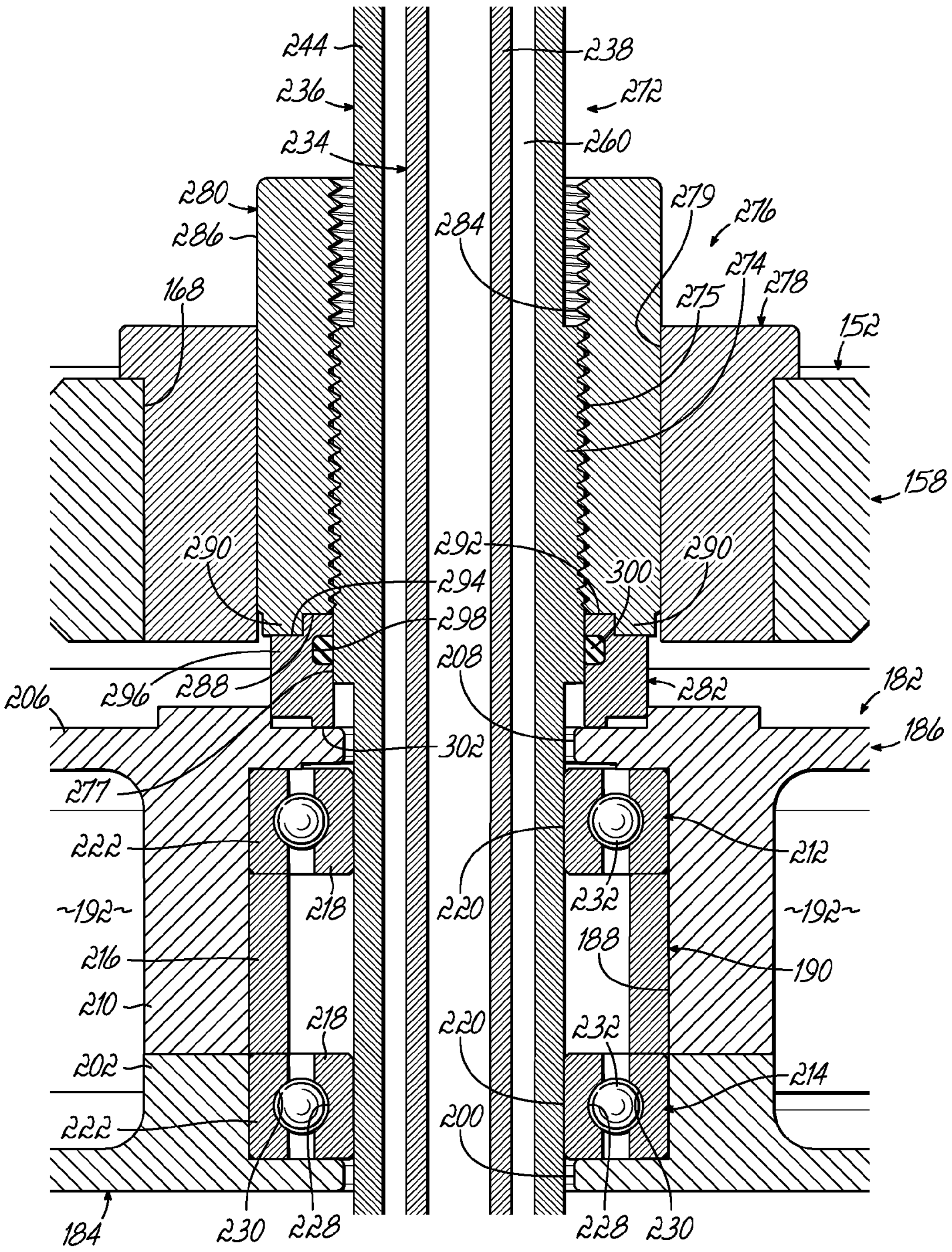
FIG. 21 is an enlarged view of a portion of the rotor assembly of FIG. 20 showing additional details thereof.

Advantageously, and with particular reference to FIG. 20, the liquid transfer assembly 272 remains stationary while the rotor 154 is spinning. The liquid transfer assembly 272 provides an inner pathway through which supernatant can exit the rotor 154, and an annular pathway around the inner pathway through which an incoming liquid (such as a suspension of cells in supernatant) can enter the rotor 154.

Figure 22:
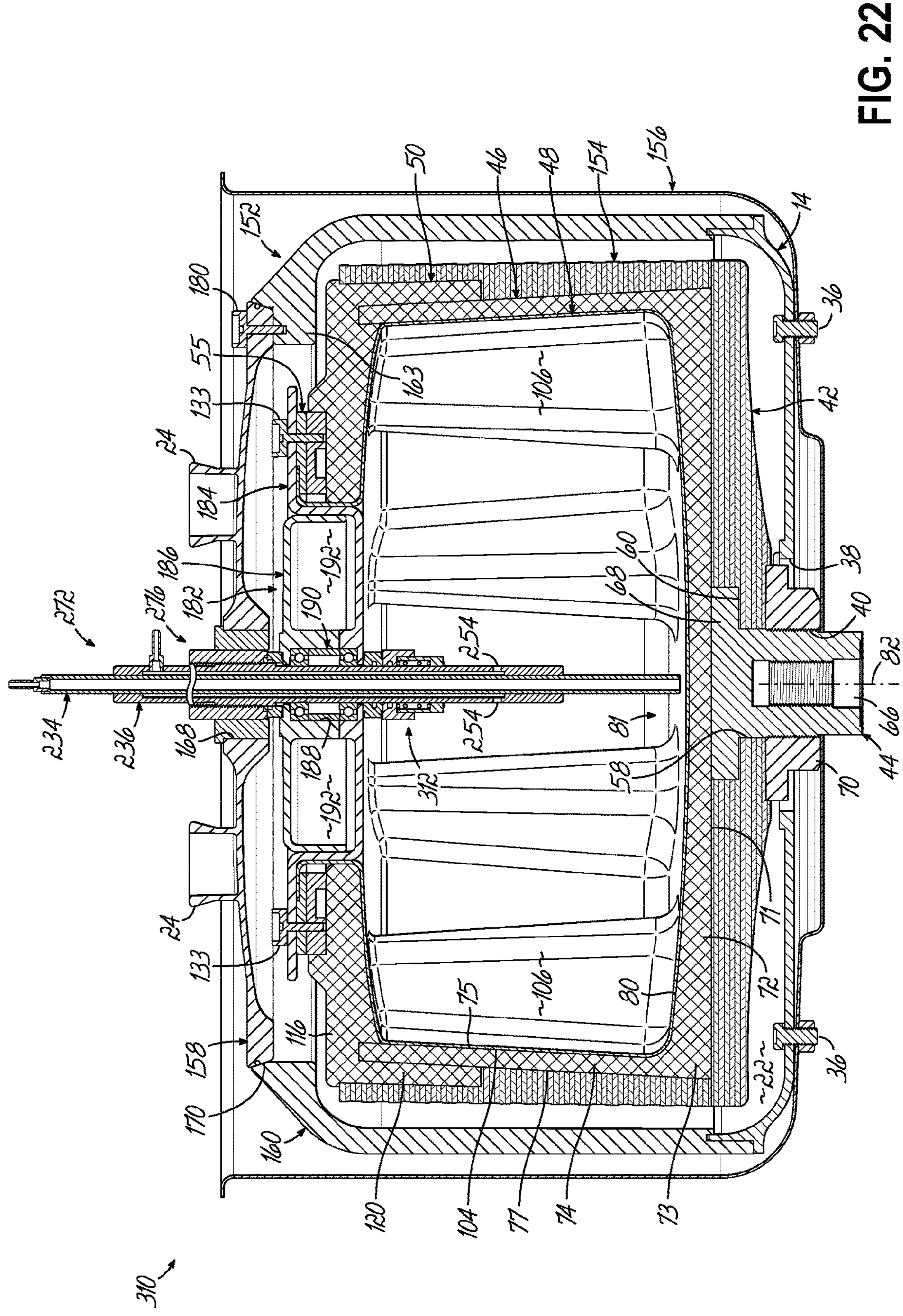
FIG. 22 is a schematic cross-sectional view of the rotor assembly of FIG. 18 including a lower seal assembly.
Figure 23:
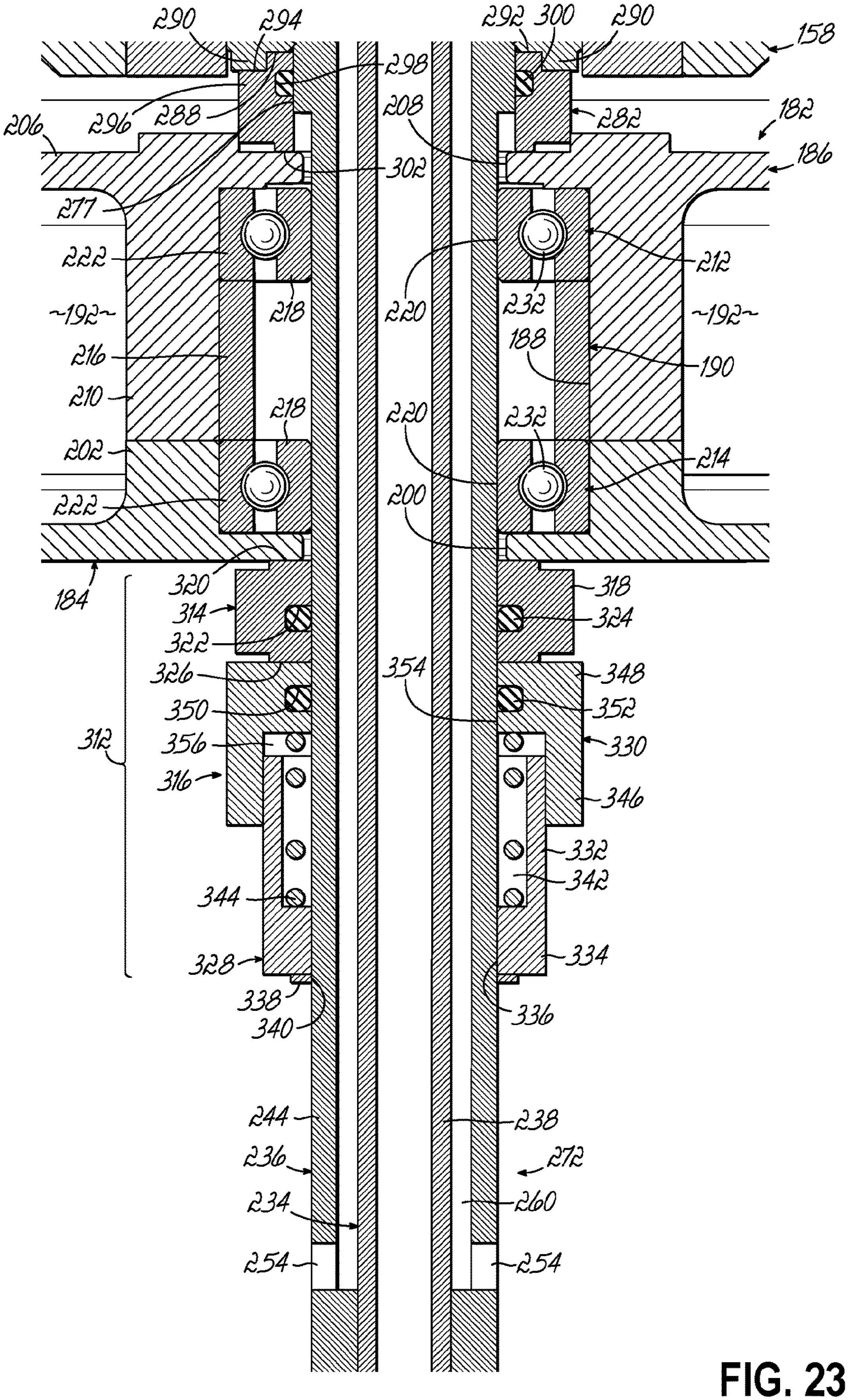
FIG. 23 is an enlarged view of a portion of the rotor assembly of FIG. 22 showing additional details thereof.

FIGS. 22 and 23 depict a continuous-flow sealed rotor assembly 310 in accordance with another alternative embodiment of the present invention in which like reference numbers refer to like components of the rotor assemblies 10, 150, 270 described above, and in which the rotor assembly 310 includes a lower seal assembly 312. The lower seal assembly 312 may operate alone or in conjunction with the upper seal assembly 276 to prevent feed discharge due to rotation of the rotor 154. The lower seal assembly 312 may include a lower seal bearing 314 and a support assembly 316. The support assembly 316 may urge the seal bearing 314 upward in an axial direction along the liquid transport assembly 272 to provide positive engagement between the seal bearing 314 and the lower section 184 of holder 182

The seal bearing 314 may comprise a circumferential ring 318 that includes a smooth upper surface 320, an inner groove 322 which locates an elastic member 324 (e.g., a silicon O-ring), and a smooth lower surface 326. The seal bearing 314 may remain in a fixed angular position about the axis of rotation 82, and may press upward on the lower plate 198 of holder 182 as the rotor 154 rotates.

The upper and lower seal bearings 282, 314 may be made from materials that produce wear products which are non-cytotoxic, class VI, etc., to facilitate removal of the wear products from centrifuged liquid media components in a downstream process. The seal bearings 282, 314 may be made of a performance plastic (e.g., polyimide (PI), polyamide-imide (PAI), polybenzimidazole (PBI), or the like), or an internally lubricated acetal-based material, such as Turcite®, which is available from the Aetna Plastics Corp of Cleveland, Ohio.

The support assembly 316 may include a retainer 328 and a bearing support 330. The retainer 328 may include a cylindrical sleeve 332 and an annular flange 334 that extends radially inward from a bottom portion of the cylindrical sleeve 332. The annular flange 334 may define a central opening 336 through which the liquid transport assembly 178 can be inserted. The central opening 336 may have a diameter slightly larger than the outer diameter of the feed tube 244. The central opening 336 of retainer 328 may thereby provide a friction or sliding fit with the feed tube 244 of liquid transport assembly 272. The diameter of central opening 336 may be sufficiently close to the outer diameter of feed tube 244 to prevent lateral movement of the retainer 328. The retainer 328 may be located along the feed tube 244 by a retaining ring 338 that engages a groove 340 in the outer surface of feed tube 244.

The cylindrical sleeve 332 of retainer 328 may have an inner diameter sufficiently larger than the outer diameter of feed tube 244 to define an annular space 342 between an inner surface of the cylindrical sleeve 332 and the outer surface of feed tube 244. The central opening 336 may be configured to concentrically align the cylindrical sleeve 332 with the feed tube 244 so that the annular space 342 is evenly distributed around the outer surface of feed tube 244. The annular space 342 may be configured to receive an elastic member 344, e.g., a helical spring. The retainer 328 may locate the elastic member 344 with respect to the feed tube 244 so that when the elastic member 344 is compressed, it urges the seal bearing 314 in an upward direction.

The bearing support 330 may include a cylindrical sleeve 346, and an annular flange 348 that extends radially inward from a top portion of the cylindrical sleeve 346. The annular flange 348 may include an inner groove 350 which locates an elastic member 352 (e.g., a silicon O-ring), and define a central opening 354 through which the liquid transport assembly 272 can be inserted. The central opening 354 may have a diameter slightly larger than an outer diameter of the feed tube 244. The central opening 354 of bearing support 330 may thereby provide a sliding fit with the feed tube 244 of liquid transport assembly 178 that allows axial movement of the bearing support 330. The diameter of central opening 354 may be sufficiently close to the outer diameter of the feed tube 244 to prevent significant lateral movement of the bearing support 330. The central opening 354 may thereby contribute to maintaining axial alignment between the bearing support 330 and the retainer 328.

The cylindrical sleeve 346 of bearing support 330 may have an inner diameter sufficiently larger than the outer diameter of the cylindrical sleeve 332 of retainer 328 to provide a sliding fit between the cylindrical sleeves 332, 346 that allows axial movement of the bearing support 330. The cylindrical sleeves 332, 346 may thereby contribute to maintaining axial alignment between the retainer 328 and bearing support 330 while allowing axial movement of the bearing support 330. To ensure freedom of movement of the bearing support 330, the position of the retaining ring 338 along the feed tube 244 may be selected to provide a headspace 356 between the top of the sleeve 332 of retainer 328 and a bottom surface of the flange 348.

The centrifuge in which rotor 154 is spun may be equipped to pump or otherwise convey a suspension, such as from a bioreactor, into the rotor 154 via the annular pathway. The centrifuge may also be equipped to convey supernatant out of the rotor 154 through the inner pathway. The incoming and outgoing liquids may be conveyed into and out of the rotor 154, respectfully, at suitable flow rates and over suitable time periods, examples of which are described below in connection with FIGS. 24 and 25.

Centrifuges for use with embodiments of the present invention may include a spindle, a housing that defines a chamber configured to receive the rotor assembly, a drive unit, a lid configured to enable loading of the rotor assembly into and removal of the rotor assembly from the chamber, and a controller. The housing and chamber may each be made from any suitable material. For example, the housing may be made from galvanized and powder coated high strength steel, and the chamber may be made from stainless steel.

The drive unit may include a motor (e.g., an induction motor) and a drive circuit that provides electrical power to the motor in response to signals from the controller. The motor may include an output shaft that is operatively coupled to the spindle, and one or more input terminals that are operatively coupled to the drive circuit. The controller may provide signals to the drive circuit that cause the motor to selectively apply torque to the spindle. The controller may thereby control the angular acceleration and velocity of the rotor according to a centrifugation process programmed into the controller.

The lid may be configured to secure the rotor assembly to the centrifuge. To this end, the lid may include a locking mechanism that prevents the lid from being opened when the rotor is rotating, and an opening configured to accommodate the liquid transport assembly. One or both of the lid and housing may include sensors that detect if the lid is closed and latched. The controller may be operatively coupled to the sensors and locking mechanism, and configured so that the lid of the centrifuge cannot be opened unless the centrifuge is switched on and the rotor is at a complete stop. The controller may also prevent the centrifuge from being started until the lid has been closed properly. The locking mechanism may include a mechanical release that allows this locking feature to be overridden so that the lid can be opened in case of an emergency. For example, the mechanical release may allow the lid to be opened so that rotor assembly can be removed during a power outage.

The controller may include a processor, a memory, and an input/output (I/O) interface. The processor may include one or more devices that perform operations on data based on internal logic or operational instructions that are stored in memory. The memory may include a single memory device or a plurality of memory devices capable of storing data. Computer program code embodied as one or more computer software applications residing in the memory may have instructions executed by the processor. One or more data structures may also reside in memory, and may be used by the processor or application to store or manipulate data.

The I/O interface may provide a machine interface that operatively couples the processor to other devices and systems, such as the sensors, the drive unit, and a user interface. The application may thereby work cooperatively with the external devices and systems by communicating via the I/O interface to provide the various features, functions, applications, processes, or modules of embodiments of the present invention.

The user interface may be configured to enable the user to select or otherwise program operational parameters into the centrifuge, such as the run speed, Relative Centrifugal Force (RCF), run time, run temperature, run profile (acceleration and braking curves), etc. To this end, the user interface may include one or more of a keypad, a keypad lock, option indicators, a display, a menu key, function keys, or any other suitable devices for receiving input from, and providing information to, the user. For example, the display may include one or more of an alpha-numeric or dot-matrix display, a touch screen, light emitting diodes, or the like, for displaying information regarding the operational state of the centrifuge. The user interface may provide a number of preset acceleration and braking curves (e.g., nine acceleration and ten deceleration curves) that are selectable by the user. The user interface may also be configured to allow the user to store centrifugation programs for future use, and select previously stored centrifugation programs for execution by the controller.

The acceleration and braking curves may include slow-start, slow-stop, and brake-off curves. The slow-start curves may provide gentle acceleration over a low range of speeds (e.g., from 0 to 250 RPM), and transition to a nominal or a maximum rate of angular acceleration at speeds above the low range (e.g., from 250 RPM to the maximum RPM, which may be in a range of 6,000 to 10,000 RPM). The slow-start acceleration rate provided by the centrifuge during a centrifugation process may be defined by the selected acceleration curve. For example, the acceleration profiles may be numbered (e.g., from one to nine) with the lowest number providing the lowest slow-start acceleration rate, and each successive number providing a slow-start acceleration rate that is incrementally higher up to the highest number.

Similarly, the slow-stop curves may provide gentle deceleration over another low range of speeds (e.g., from 0 to 500 RPM) and nominal deceleration braking from the run speed to the high end of the low range. That is, for a deceleration low range of 0 to 500 RPM, and a run speed of 6,000 RPM, the slow-stop curve may transition from a nominal deceleration rate to a lower slow-stop rate of deceleration when the rotor of the rotor assembly drops to 500 RPM. The slow-stop deceleration rate may be defined by selection of one of a plurality of numbered deceleration profiles (e.g., from one to ten), with the lowest number providing the lowest slow-stop deceleration rate.

Selecting the brake-off curve may deactivate nominal deceleration braking for a coasting stop from any specified speed. In this case, the time it takes for the rotor of the rotor assembly to stop may depend on the specified transition speed, windage, friction, and inertia of the rotor. The brake-off transition speed may be set independently of run speed, and may be unaffected by changes to the run speed. If the transition speed is set higher than the run speed, at run termination, the centrifuge may coast to a stop from the run speed at the end of a centrifugation step or process.

The controller of the centrifuge may be operatively coupled to a liquid handling system including one or more pumps, valves, manifolds, and tubes. The liquid handling system may be configured to selectively define flow pathways that couple the input port of the feed assembly to a source of a liquid medium to be processed (e.g., a suspension), and the output port of the decanting assembly to a container for receiving a processed liquid medium, e.g., supernatant or pellet. Enabling the controller of the centrifuge to control when liquid media are added to and removed from the bio-process bag 48 may facilitate automation of continuous flow and batch processing of liquid media. In particular, the controller of the centrifuge may cause liquid media to be added to, and processed liquid media to be removed from, the rotor assembly at specific points in a centrifugation process, e.g., at specified rotor speeds or during specified processing steps.

FIGS. 24-27 depict exemplary centrifugation processes 410, 430 for separating components of a liquid medium in accordance with embodiments of the present invention. While references may be made to the flow pathways of FIGS. 20 and 22 in the following description for clarity, it should be appreciated that embodiments of the present invention are not limited to the specific flow pathways depicted by these figures. It should therefore be further appreciated that other suitable flow pathways, such as flow pathways provided by the other exemplary liquid transport assemblies 35, 178 described herein, and other similar flow pathways, may also be used.

Referring now to FIGS. 24 and 25, at step one of process 410, the rotor 154 may be empty and stationary. While the rotor assembly 270, 310 is in this initial state, the process 410 may proceed to step two and load an initial amount (e.g., 25 liters) of suspension 412 into the bio-process bag 48, e.g., through one of the inner or annular pathways of liquid transfer assembly 272. The suspension 412 may be loaded, for example, by gravity feed or by pumping the suspension 412 from a bio-reactor or other source of suspension into the input port 246 of feed assembly 236. While at rest, an air-liquid interface 414 between the suspension 412 and the air in the sealed chamber may be essentially flat.

After the initial amount of suspension 412 has been loaded into the bio-process bag 48, the process 410 may proceed to step three, and begin accelerating the rotor 154 to a transfer rate of rotation, e.g., 100-150 Rotations Per Minute (RPM). The rate of angular acceleration in this initial spin-up stage may be relatively low (e.g., 0.15 rad/sect) to avoid excessive churning of the suspension 412 by movement of the bio-process bag 48 relative to the suspension 412.

In response to the angular velocity of the suspension 412 increasing to the transfer rate of rotation, the air-liquid interface 414 of suspension 412 may begin to acquire a parabolic shape. This parabolic shape may result from the suspension 412 responding to centrifugal force generated by rotation of the suspension 412 relative to a fixed reference frame. The centrifugal force may also cause the air-liquid interface 414 proximate to the axis of rotation to move downward along the lower portion of the liquid transport assembly 272 as the rate of rotation increases. This increase in the depth of the parabolic shape may result in the input port 240 of decanting assembly 234 becoming partially or completely uncovered by the suspension 412 as the rate of rotation increases.

After a period of time (e.g., 3 to 5 minutes) at the transfer rate of rotation, the process 410 may proceed to step four, and accelerate the rotor 154 to an operational rate of rotation (e.g., 5,000 to 5,500 RPM). Movement of the suspension 412 into the interior pockets 106 of bio-process bag 48 due to increasing centrifugal force may allow a relatively higher rate of angular acceleration (e.g., 6.0 rad/sect) in this operational spin-up stage. The operational rate of rotation may produce sufficient centrifugal force to cause the air-liquid interface 414 of suspension 412 to assume a cylindrical shape, as well as cause the suspended solids to separate from the suspending liquid and settle into the interior pockets 106 of bio-process bag 48.

Once the rotor 154 has reached the operational rate of rotation, the process 410 may proceed to step five, and maintain the operational rate of rotation for a centrifugation period, e.g., 30 minutes. During this stage, solids in the suspension 412 having a higher density than the suspending liquid may tend to sink (e.g., move radially outward), while solids lighter than the suspending liquid may tend to float (e.g., move radially inward). By replacing or supplementing gravity with much stronger centrifugal forces, the operational rate of rotation may dramatically increase the rate at which solids are separated from the suspending liquid. Centrifugation may thereby enable separation of components of a liquid medium having only slight differences in density, with suspensions having greater differences in density between the solids and liquids separating at a faster rate. As the suspended solids collect in the interior pockets 106 of bio-process bag 48, pellets 416 may form in each interior pocket 106 below a layer of supernatant 418. The pellets 416 may be separated from the supernatant 418 by a pellet-supernatant interface 420 having a neo-angle that is dependent on the rate of rotation.

While the liquid media being centrifuged is experiencing sufficient centrifugal force to cause the air-liquid interface of the liquid media to assume a cylindrical or frustoconical shape, the liquid media may be largely contained within the interior pockets 106 of the bio-process bag 48. This containment may allow higher rates of angular acceleration and deceleration without causing undue turbulence in, and thus mixing of, various components of the liquid media (e.g., the pellet 416 and supernatant 418) which have separated out as compared to rates of rotation at which the air-liquid interface 414 has assumed a parabolic shape or otherwise emerged from the interior pockets 106 of the bio-process bag 48.

After the rotor 154 has been rotating at the operational rate of rotation for the centrifugation period, the process 410 may proceed to step six and begin a multi-stage deceleration of the rotor 154. The process 410 may initially decelerate the rotor 154 from the operational rate of rotation to a transition rate of rotation (e.g., 800 RPM) at a moderate rate of angular deceleration, e.g., 1.5 rad/sect. The transition rate of rotation may be a rate of rotation at which the supernatant 418 begins to emerge from the interior pockets 106 of the bio-process bag 48.

Once the rotor 154 has been slowed to the transition rate of rotation, the process 410 may enter another stage of deceleration in which the rate of deceleration is slower than that of the initial deceleration stage, e.g., 0.15 rad/sect. During this stage of deceleration, the process 410 may slow the rate of rotation from the transition rate to a transfer rate of rotation, e.g., 100 RPM. While the rotor 154 is rotating at the transfer rate of rotation, the centrifugal force may be sufficiently low for the air-liquid interface 414 to reassume a parabolic shape. The resulting distribution of fluids may submerge the input port 240 of decanting assembly 234 in the supernatant 418, while maintaining the pellet 416 in the lower corners of the interior pockets 106 of bio-process bag 48.

While the rotor 154 is rotating at the transfer rate, the process 410 may activate a discharge pump or otherwise cause the supernatant 418 to be decanted from the bio-process bag 48 through the decanting assembly. Once the supernatant 418 has been decanted from the bio-process bag 48, the process 410 may proceed to step seven.

In step seven, the supernatant 418 may be largely removed from the bio-process bag 48, and the pellet 416 may remain in the lower corners of the interior pockets 106. At this point, the process 410 may refill the bio-process bag 48 with fresh suspension and return to step three. The process 410 may thereby repeat the separation stages and continue accumulating pellet material in the inner pockets of the bio-process bag 48. After a sufficient amount of pellet material has been collected (e.g., the interior pockets 106 of bio-process bag 48 are at or near capacity), the process 410 may slow the rotor 154 to zero RPM so that the pellets 416 can be removed. For example, if the incoming suspension contains from 5 to 10 percent cells or other pellet-forming components, one could expect to conduct five or more rounds of suspension introduction, centrifugation, and supernatant decantation before the interior pockets 106 of bio-process bag 48 were filled to or close to capacity for pellets 416 at the end of the last centrifugation round. In any case, once the pellets 416 have been removed, the bio-process bag 48 may be replaced with a new bio-process bag 48 so that the rotor assembly 270, 310 can be reused.

For certain types of pellet material, it may also be feasible to flush the pellets 416 at the end of the last round of centrifugation with a buffer solution. The buffer solution may be introduced via the feed assembly 236 (e.g., through the annular pathway), and removed via the decanting assembly 234 (e.g., through the inner pathway). Once the pellets 416 have been flushed, one or more rounds of fresh suspension may be introduced and centrifuged, followed in some situations by one or more rounds of supernatant decantation.

Advantageously, by enabling the bio-process bag 48 to be emptied of supernatant and replaced with fresh suspension without removing the rotor 154 from the rotor assembly 270, 310, or the rotor assembly 270, 310 from the centrifuge, the process 410 may enable large amounts of suspension to be processed automatically. This may be particularly advantageous when processing suspensions having a relatively low percentages of solids such that a large volume of suspension can be processed before the bio-process bag 48 contains a sufficient amount of pellet 416 to require replacement.

Referring now to FIGS. 26 and 27, at step one of process 430, the rotor 154 may be empty and stationary. While the rotor assembly 270, 310 is in this initial state, the process 430 may proceed to step two and load an initial amount (e.g., 20 liters) of density gradient solution 432 into the bio-process bag 48, e.g., through one of the inner or annular pathways of liquid transfer assembly 272. This initial amount may be less than the total capacity of the rotor 154 to allow the addition of another solution at a later stage. The density gradient solution 432 may be loaded, for example, by gravity feed or by pumping the density gradient solution 432 into the input port 246 of feed assembly 236. While at rest, an air-liquid interface 434 between the density gradient solution 432 and the air in the sealed chamber may be essentially flat.

After the initial amount of density gradient solution 432 has been loaded into the bio-process bag 48, the process 430 may proceed to step three, and begin accelerating the rotor 154 to a transfer rate of rotation, e.g., 100-150 Rotations Per Minute (RPM). The rate of angular acceleration in this initial spin-up stage may be relatively low (e.g., 0.15 rad/sect) to avoid excessive churning of the density gradient solution 432 by movement of the bio-process bag 48 relative to the density gradient solution 432.

In response to the angular velocity of the density gradient solution 432 increasing to the transfer rate of rotation, the air-liquid interface 434 of density gradient solution 432 may begin to acquire a parabolic shape. This parabolic shape may result from the density gradient solution 432 responding to centrifugal force generated by rotation of the density gradient solution 432 relative to a fixed reference frame. The centrifugal force may also cause the air-liquid interface 434 proximate to the axis of rotation to move downward along the lower portion of the liquid transport assembly 272 as the rate of rotation increases. This increase in the depth of the parabolic shape may result in the input port 240 of decanting assembly 234 becoming partially or completely uncovered by the density gradient solution 432 as the rate of rotation increases.

After a period of time (e.g., 3 to 5 minutes) at the transfer rate of rotation, the process 430 may proceed to step four, and accelerate the rotor 154 to an operational rate of rotation (e.g., 5,000 to 5,500 RPM). Movement of the density gradient solution 432 into the interior pockets 106 of bio-process bag 48 due to increasing centrifugal force may allow a relatively higher rate of angular acceleration (e.g., 6.0 rad/sect) in this operational spin-up stage. The operational rate of rotation may produce sufficient centrifugal force to cause the air-liquid interface 434 of density gradient solution 432 to assume a cylindrical shape. Once the rotor 154 has reached the operational rate of rotation, the process 430 may allow the density gradient solution 432 to stabilize for a period of 2-3 minutes in order to form a density gradient along a radial direction.

After the density gradient solution has formed the density gradient, the process 430 may proceed to step five, and add an amount of suspension 436 (e.g., 5 liters) into the rotor 154 that brings the total amount of fluid up to the capacity of the rotor (e.g., 25 liters). In response to the suspension 436 being added to the rotor 154, a zonal gradient may begin to form at the interface between the suspension 436 and the density gradient solution 432.

The process 430 may proceed to step 6 and maintain the operational rate of rotation for a centrifugation period, e.g., 60 minutes. During this stage, the zonal fluid particles may begin to settle toward the maximum radius of the rotor 154. Over time, these partials may generate cylindrical isopycnal layers 438-441 ordered according to their relative densities. This may occur as solids in the density gradient solution 432 seek their level, with denser solids tending to sink into lower layers of the density gradient solution 432 (e.g., by moving radially outward) and less-dense solids tending to remain in less dense layers. By replacing or supplementing gravity with much stronger centrifugal forces, the operational rate of rotation may dramatically increase the rate at which solids are separated into the isopycnal layers 438-441.

After the rotor 154 has been rotating at the operational rate of rotation for the centrifugation period, the process 430 may proceed to step seven, and begin slowly decelerating the rotor 154 to zero rpm. In response to the reduction in centrifugal force, the isopycnal layers 438-441 may form horizontal layers stacked one on top of the other based on their relative densities. Once the rotor 153 has come to a stop, the process 430 may pump out the isopycnal layers 438-441 in separate stages.

In step eight, the isopycnal layers 438-441 may be largely removed from the bio-process bag 48. At this point, the process 430 may refill the bio-process bag 48 with fresh density gradient solution 432 and return to step three. The process 430 may thereby repeat the separation stages and continue processing suspension 436. In an alternative embodiment, the bio-process bag 48 may be replaced with a new bio-process bag 48 so that the rotor assembly 270, 310 can be reused, e.g., to process a different suspension.

While the present invention has been illustrated by the description of specific embodiments thereof, and while the embodiments have been described in considerable detail, it is not intended to restrict or in any way limit the scope of the appended claims to such detail. The various features discussed herein may be used alone or in any combination. Additional advantages and modifications will readily appear to those skilled in the art. The present invention in its broader aspects is therefore not limited to the specific details, representative apparatus and methods, and illustrative examples shown and described. Accordingly, departures may be made from such details without departing from the scope or spirit of the general inventive concept.

What is claimed is:

1. A rotor assembly for centrifuging liquid media, comprising:

a bio-process bag including a lower portion and an upper portion, the upper portion of the bio-process bag including an axially-aligned neck connected to the lower portion of the bio-process bag and a radially-aligned skirt that extends outward from the axially-aligned neck;

a drum including a first base having an outer rim and a first circumferential wall that extends upward from the outer rim, the first circumferential wall including a first outer surface and a first inner surface, the first inner surface defining a first opening that receives the lower portion of the bio-process bag, wherein the drum includes a plurality of axially-aligned baffles and wherein the lower portion of the bio-process bag includes a plurality of interior pockets and a plurality of exterior pockets each located between two adjacent interior pockets, each of the exterior pockets being configured to engage a respective one of the axially-aligned baffles of the drum, a pressure ring including a first radially-aligned flange and a second circumferential wall, the first radially-aligned flange including a first upper surface, an outer edge, and an inner edge that defines a second opening, the second circumferential wall extending downwardly from the outer edge and having a second inner surface that engages the first outer surface of the first circumferential wall of the drum; and a holder including a third circumferential wall having an outwardly-facing surface and a second radially-aligned flange having a first lower surface, the second radially-aligned flange extending outwardly from an upper portion of the third circumferential wall, at least one of the outwardly-facing surface and the first lower surface operatively coupling the upper portion of the bio-process bag to the pressure ring.

2. The rotor assembly of claim 1, further comprising:

a compression ring including a second upper surface having a recessed annulus, the recessed annulus being open on an axial side of the compression ring and defining a radially-aligned circumferential channel with the first lower surface of the second radially-aligned flange of the holder, the radially-aligned circumferential channel being configured to receive at least a portion of the radially-aligned skirt of the bio-process bag.

3. The rotor assembly of claim 2, wherein each of the second radially-aligned flange of the holder and the compression ring includes a plurality of pass-through holes, and further comprising:

a plurality of retaining bolts; and a retaining ring including a plurality of threaded holes each configured to receive a respective one of the retaining bolts, each retaining bolt passing through a respective pass-through hole of the second radially-aligned flange and the compression ring, wherein the compression ring is subjected to a compressive force by the second radially-aligned flange and the retaining ring in response to tightening of the retaining bolts.

4. The rotor assembly of claim 1, further comprising:

a housing including a cover and a second base configured to receive the cover, wherein the bio-process bag, the drum, the pressure ring, and the holder comprise a rotor that rotates within the housing.

5. The rotor assembly of claim 4, wherein the third circumferential wall of the holder includes an inwardly-facing surface that defines a fourth opening, and further comprising:

a decanting assembly that passes through the cover and the fourth opening, and that has an input port through which a first liquid medium is removed from the bio-process bag, wherein the first base includes a fourth upper surface having an upwardly-facing bowl shape that defines a catchment proximate to an axis of rotation of the rotor, and the input port of the decanting assembly is located proximate to the catchment.

6. The rotor assembly of claim 4, further comprising:

a bearing assembly;

a liquid transport assembly that passes through the cover and the bearing assembly, and includes a first port through which a first liquid medium is removed from the bio-process bag, and a second port through which a second liquid medium is provided to the bio-process bag.

7. The rotor assembly of claim 6, wherein the bearing assembly comprises:

an upper bearing including a first inner ring having a first bore;

a lower bearing including a second inner ring having a second bore; and a cylindrical spacer that vertically positions the upper bearing relative to the lower bearing, wherein the first bore and the second bore couple the bearing assembly to the liquid transport assembly.

8. The rotor assembly of claim 1, wherein the holder includes a first central opening, and further comprising:

a liquid transport assembly that passes through the first central opening, and includes a first port through which a first liquid medium is removed from the bio-process bag, and a second port through which a second liquid medium is provided to the bio-process bag;

a seal bearing including a first inner groove and a second upper surface in rotational contact with the holder; and a first elastic member located in the first inner groove of the seal bearing that couples the seal bearing to the liquid transport assembly.

9. The rotor assembly of claim 8, wherein the holder includes a lower plate coupled to a lower portion of the third circumferential wall, and the first central opening is in the lower plate.

10. The rotor assembly of claim 9, further comprising:

a second elastic member having a first end and a second end, and configured to urge the seal bearing into the rotational contact with the lower plate of the holder.

11. The rotor assembly of claim 10, further comprising:

a retainer including a first cylindrical sleeve having an inner surface, and a first annular flange that extends radially inward from a bottom portion of the first cylindrical sleeve, the first annular flange defining a second central opening that provides a friction or sliding fit with the liquid transport assembly, and the first cylindrical sleeve having an inner diameter sufficient to define an annular space between the inner surface of the first cylindrical sleeve and the liquid transport assembly, wherein the first end of the second elastic member is retained in the annular space.

12. The rotor assembly of claim 11, further comprising:

a bearing support including a second cylindrical sleeve and a second annular flange that extends radially inward from a top portion of the second cylindrical sleeve, the second annular flange having an upper surface, a lower surface, and defining a third central opening that provides a sliding fit with the liquid transport assembly, wherein the second end of the second elastic member engages the lower surface of the second annular flange, and the upper surface of the second annular flange engages a bottom surface of the seal bearing.

13. The rotor assembly of claim 12, further comprising:

a third elastic member, wherein the second annular flange includes a second inner groove, and the third elastic member is located in the second inner groove and couples the bearing support to the liquid transport assembly.

* * * * *